United States Patent
Chi et al.

(10) Patent No.: US 9,528,432 B2
(45) Date of Patent: Dec. 27, 2016

(54) SYSTEM FOR CONTROLLING AN AIR HANDLING SYSTEM INCLUDING AN ELECTRIC MOTOR ASSISTED VARIABLE GEOMETRY TURBOCHARGER

(75) Inventors: John N. Chi, Dubuque, IA (US); John M. Mulloy, Columbus, IN (US); Sriram S. Popuri, Greenwood, IN (US); Timothy R. Frazier, Columbus, IN (US); Martin T. Books, Columbus, IN (US); Divakar Rajamohan, Columbus, IN (US); Indranil Brahma, Bloomington, IN (US)

(73) Assignee: Cummins, Inc., Columbus, IN (US)

( * ) Notice: Subject to any disclaimer, the term of this patent is extended or adjusted under 35 U.S.C. 154(b) by 852 days.

(21) Appl. No.: 13/244,551

(22) Filed: Sep. 25, 2011

(65) Prior Publication Data

US 2013/0074495 A1  Mar. 28, 2013

(51) Int. Cl.
| | | |
|---|---|---|
| *F02B 33/44* | (2006.01) | |
| *F02M 25/07* | (2006.01) | |
| *F02B 39/10* | (2006.01) | |
| *F02B 37/10* | (2006.01) | |
| *F02B 37/14* | (2006.01) | |

(Continued)

(52) U.S. Cl.
CPC ............... *F02B 39/10* (2013.01); *F02B 37/10* (2013.01); *F02B 37/14* (2013.01); *F02D 41/0007* (2013.01); *F02D 41/0052* (2013.01); *F02D 41/0065* (2013.01); *F02D 41/1448* (2013.01); *F02D 41/1462* (2013.01); *F02D 41/1467* (2013.01); *F02B 37/24* (2013.01); *F02D 2041/141* (2013.01); *F02D 2041/1433* (2013.01); *F02M 26/05* (2016.02); *F02M 26/10* (2016.02); *F02M 26/23* (2016.02); *Y02T 10/144* (2013.01); *Y02T 10/47* (2013.01)

(58) Field of Classification Search
CPC ........... F02B 37/10; F02B 37/14; F02B 39/10; F02B 37/24; F02D 41/0007; F02D 41/0065; F02D 41/1448; F02D 41/1462; F02D 41/1647; F02D 41/0052; F02D 2041/141; F02D 2041/1433; F02D 41/1467; Y02T 10/47; Y02T 10/144; F02M 25/0713; F02M 25/0727; F02M 25/0707
USPC ........................................ 60/605.2, 607, 608
See application file for complete search history.

(56) References Cited

U.S. PATENT DOCUMENTS

| | | | | |
|---|---|---|---|---|
| 6,871,498 | B1 * | 3/2005 | Allen et al. ...................... | 60/608 |
| 7,043,916 | B2 * | 5/2006 | Masuda ........................... | 60/608 |

(Continued)

*Primary Examiner* — Thai Ba Trieu
(74) *Attorney, Agent, or Firm* — Faegre Baker Daniels LLP

(57) ABSTRACT

A system and method are provided for controlling an air handling system for an internal combustion engine including a turbocharger having a variable geometry turbine fluidly coupled to an exhaust manifold of the engine and a compressor fluidly coupled to an intake manifold of the engine, and an electric motor coupled to a rotatable shaft connected between the compressor and the variable geometry turbine. A target torque required to drive the compressor to achieve target compressor operating parameters is determined, a maximum available torque that can be supplied by the variable geometry turbine in response to a target exhaust gas flow through the variable geometry turbine is determined, and the electric motor is enabled to supply supplemental torque to the rotatable shaft if the target torque is greater than the maximum available torque.

20 Claims, 11 Drawing Sheets

(51) Int. Cl.
*F02D 41/00* (2006.01)
*F02D 41/14* (2006.01)
F02B 37/24 (2006.01)

(56) References Cited

U.S. PATENT DOCUMENTS

| 7,478,533 B2* | 1/2009 | Ueno .............................. 60/608 |
| 8,143,732 B2* | 3/2012 | Algrain ................... F02B 37/10 |
| | | 290/1 A |
| 2008/0051976 A1* | 2/2008 | Kimoto et al. ............... 701/103 |
| 2008/0282699 A1* | 11/2008 | Barthelet et al. ............... 60/608 |
| 2014/0076278 A1* | 3/2014 | Takahashi ............... F02D 23/00 |
| | | 123/344 |

* cited by examiner

SYSTEM FOR CONTROLLING AN AIR HANDLING SYSTEM INCLUDING AN ELECTRIC MOTOR ASSISTED VARIABLE GEOMETRY TURBOCHARGER

FIELD OF THE INVENTION

The present invention relates generally to air handling systems for internal combustion engines, and more specifically to systems for controlling such air handling systems including an electric motor-assisted variable geometry turbocharger.

BACKGROUND

It is desirable to control an air handling system of an internal combustion engine, particularly during transient events, to provide for a responsive air handling system capable of responding appropriately to transient operating conditions.

SUMMARY

The present invention may comprise one or more of the features recited in the attached claims, and/or one or more of the following features and combinations thereof. An air handling system for an internal combustion engine may comprise a turbocharger having a variable geometry turbine fluidly coupled to an exhaust manifold of the engine and a compressor fluidly coupled to an intake manifold of the engine, the variable geometry turbine rotatably connected to the compressor via a rotatable shaft such that the variable geometry turbine rotatably drives the compressor via the rotatable shaft in response to exhaust gas passing through the variable geometry turbine, an electric motor coupled to the rotatable shaft, the electric motor supplying supplemental torque to the rotatable shaft when enabled for operation, and a control circuit including a memory having instructions stored therein that are executable by the control circuit to determine a target torque required to drive the compressor to achieve target compressor operating parameters, to determine a maximum available torque that can be supplied by the variable geometry turbine in response to target exhaust gas conditions, and to enable the electric motor to supply the supplemental torque to the rotatable shaft if the target torque is greater than the maximum available torque.

The instructions stored in the memory may further include instructions that are executable by the control circuit to control the variable geometry turbine to a geometry in which the turbine produces torque in an amount of a difference between the target torque and the supplemental torque when the electric motor is enabled to supply the supplemental torque. The instructions stored in the memory may further include instructions that are executable by the control circuit to control the variable geometry turbine to an over-opened geometry to produce the torque in the amount of the difference between the target torque and the supplemental torque when it is desirable to optimize at least one of brake specific fuel consumption or fuel economy. The air handling system may further include an exhaust gas recirculation (EGR) fluid passageway fluidly coupled between the exhaust manifold and the intake manifold, and the instructions stored in the memory may further include instructions that are executable by the control circuit to control the variable geometry turbine to an over-closed geometry to produce the torque in the amount of the difference between the target torque and the supplemental torque when it is desirable to maximize exhaust gas flow through the EGR fluid passageway.

Alternatively or additionally, the instructions stored in the memory may further include instructions that are executable by the control circuit to disable the electric motor such that the electric motor does not supply the supplemental torque to the rotatable shaft if the maximum available torque is greater than or equal to the target torque.

Alternatively or additionally, the instructions stored in the memory may further include instructions that are executable by the control circuit to determine the target torque required to drive the compressor to achieve target compressor operating parameters by determining a target compressor torque corresponding to a target torque required to drive the compressor alone to achieve the target compressor operating conditions, determining an inertia torque as a function of a target rotational speed of the rotatable shaft, the inertia torque corresponding to torque associated with rotation of the rotatable shaft and of the electric motor, determining a bearing housing torque as a function of the target rotational speed of the rotatable shaft, the bearing housing torque corresponding to a friction torque associated with at least one bearing of a bearing housing of the turbocharger, and determining the target torque as a sum of the target compressor torque, the inertia torque and the bearing housing torque. The instructions stored in the memory may further include instructions that are executable by the control circuit to determine the target rotational speed of the rotatable shaft based on the target compressor operating parameters. The instructions stored in the memory may further include instructions that are executable by the control circuit to determine the target compressor torque as a function of a target compressor outlet pressure and a target compressor flow rate.

Alternatively or additionally, the instructions stored in the memory may further include instructions that are executable by the control circuit to determine the target exhaust gas conditions based on target charge parameters and target engine fueling parameters. The air handling system may further include an exhaust gas recirculation (EGR) fluid passageway fluidly coupled between the exhaust manifold and the intake manifold, and the instructions stored in the memory may further include instructions that are executable by the control circuit to determine the target exhaust gas conditions based on a target EGR flow rate.

A method is illustratively provided for controlling an air handling system for an internal combustion engine including a turbocharger having a variable geometry turbine fluidly coupled to an exhaust manifold of the engine and a compressor fluidly coupled to an intake manifold of the engine, and an electric motor coupled to a rotatable shaft connected between the compressor and the variable geometry turbine. The method may comprise determining a target torque required to drive the compressor to achieve target compressor operating parameters, determining a maximum available torque that can be supplied by the variable geometry turbine in response to a target exhaust gas flow through the variable geometry turbine, and enabling the electric motor to supply supplemental torque to the rotatable shaft if the target torque is greater than the maximum available torque.

The method may further comprise controlling the variable geometry turbine to a geometry in which the turbine produces torque in an amount of a difference between the target torque and the supplemental torque when the electric motor is enabled to supply the supplemental torque. The method may further comprise controlling the variable geometry turbine to an over-opened geometry to produce the torque in the amount of the difference between the target torque and the supplemental torque when it is desirable to optimize at least one of brake specific fuel consumption or fuel economy. The air handling system may further include an exhaust gas recirculation (EGR) fluid passageway fluidly coupled between the exhaust manifold and the intake manifold, and the method may further comprise controlling the variable geometry turbine to an over-closed geometry to produce the torque in the amount of the difference between the target torque and the supplemental torque when it is desirable to maximize exhaust gas flow through the EGR fluid passageway.

Alternatively or additionally, the method may further comprise disabling the electric motor such that the electric motor does not supply the supplemental torque to the rotatable shaft if the maximum available torque is greater than or equal to the target torque.

Alternatively or additionally, determining the target torque required to drive the compressor to achieve target compressor operating parameters may comprise determining a target compressor torque corresponding to a target torque required to drive the compressor alone to achieve the target compressor operating conditions, determining an inertia torque as a function of a target rotational speed of the rotatable shaft, the inertia torque corresponding to torque associated with rotation of the rotatable shaft and of the electric motor, determining a bearing housing torque as a function of the target rotational speed of the rotatable shaft, the bearing housing torque corresponding to a torque associated with a bearing housing of the turbocharger, and computing the target torque as a sum of the target compressor torque, the inertia torque and the bearing housing torque. The method may further comprise determining the target rotational speed of the rotatatable based on the target compressor operating parameters. Alternatively or additionally, the method may further comprise determining the target compressor torque as a function of a target compressor outlet pressure and a target compressor flow rate.

Alternatively or additionally, the method may further comprise determining the target exhaust gas conditions based on target charge parameters and target engine fueling parameters. The air handling system may further include an exhaust gas recirculation (EGR) fluid passageway fluidly coupled between the exhaust manifold and the intake manifold, and the method may further comprise determining the target exhaust gas conditions based on a target EGR flow rate.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
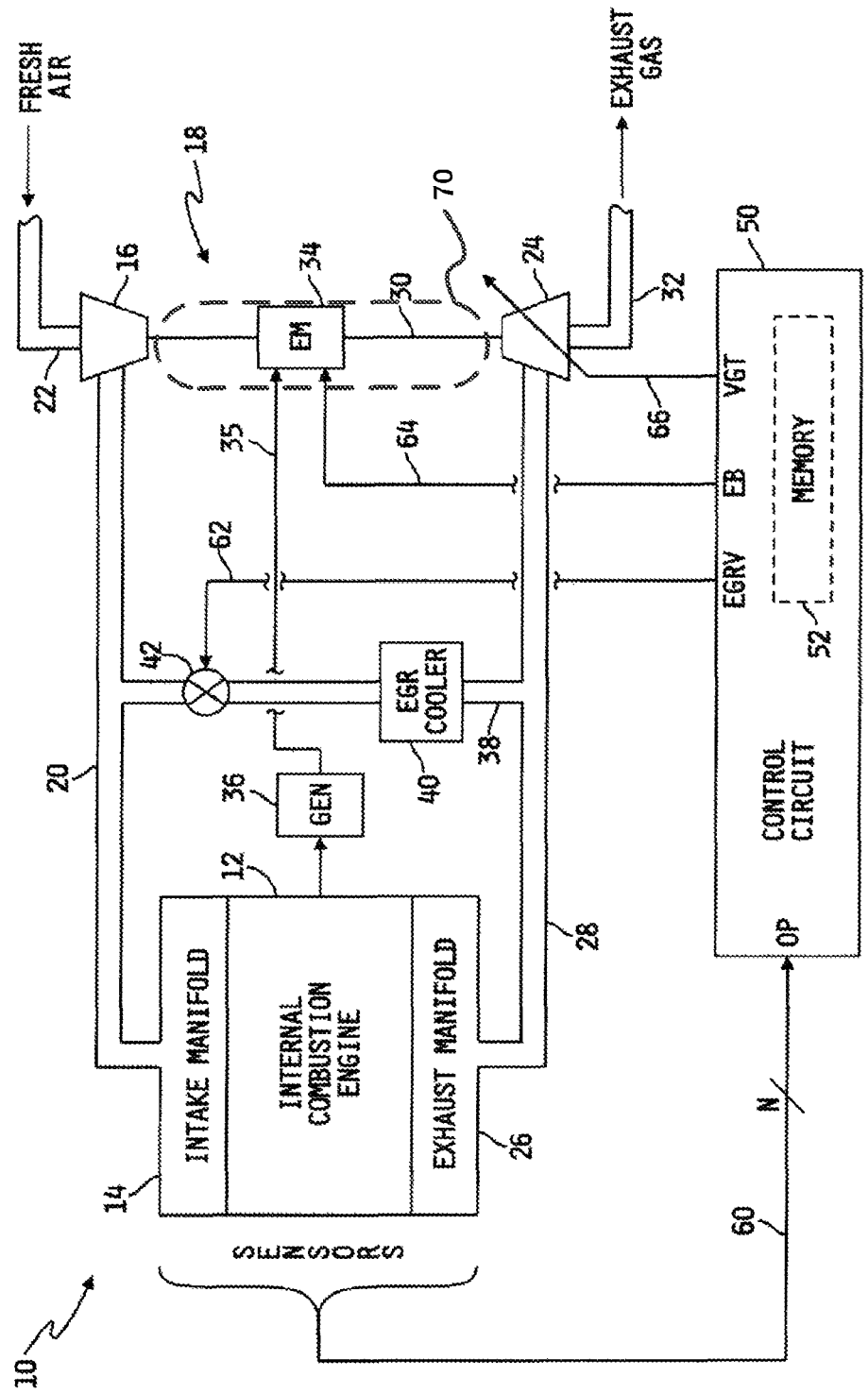
FIG. 1 is a block diagram of one illustrative embodiment of an air handling system for an internal combustion engine that includes an electric motor-assisted variable geometry turbocharger.

Referring now to FIG. 1, a block diagram is shown of one illustrative embodiment of an air handling system 10 for an internal combustion engine 12 including an electric motor-assisted variable geometry turbocharger 18. In the illustrated embodiment, the internal combustion engine 12 has an intake manifold 14 fluidly coupled to an outlet of a compressor 16 of a variable geometry turbocharger 18 via a fluid passageway 20. An inlet of the compressor 16 is fluidly coupled to ambient via a fluid passageway 22 such that the compressor 16 receives fresh air at its inlet via the fluid passageway 22 and supplies the fresh air, or so-called charge air, from its outlet to the intake manifold 14 via the fluid passageway 20. The compressor 16 is illustratively of conventional design. Optionally, a charge air cooler may be disposed in-line with the fluid passageway 20, as is known in the art, to cool the charge air supplied by the compressor 16 to the intake manifold 14 in a conventional manner.

A turbine 24 of the turbocharger 18 has an inlet fluidly coupled to an exhaust manifold 26 of the engine 12 via a fluid passageway 28, and an outlet fluidly coupled to ambient via a fluid passageway 32. The turbine 24 is illustratively a conventional variable geometry turbocharger having a variable swallowing capacity that may be selectively controlled as indicated by the diagonal arrow passing through the turbine 24 in FIG. 1. In any case, exhaust gas produced by the engine 12 passes through the exhaust gas passageway 28 to the inlet of the turbine 24, and then passes through the outlet of the turbine 24 to ambient via the exhaust gas passageway 32 in a conventional manner.

The compressor 16 of the variable geometry turbocharger 18 includes a compressor wheel or disk (not shown) and the turbine 24 likewise includes a wheel or disk (not shown), and the wheel or disk of the compressor 16 is rotatably coupled to the wheel or disk of the turbine 24 via a rotatable shaft 30. Exhaust gas flowing through the turbine 24 causes the wheel or disk of the turbine 24 to rotate, thereby causing the shaft 30, and thus the wheel or disk of the compressor 16, to also rotate. Rotation of the wheel or disk of the compressor 16 draws additional air into the intake air passageway 20, thereby increases the flow rate of air to the intake manifold 14 above what it would otherwise be without the turbocharger 18, and in this conventional manner the turbocharger 18 supplies so-called boost air to the engine 12.

In the embodiment illustrated in FIG. 1, the turbocharger 18 further includes an electric motor 34 mounted to or integral with the rotatable shaft 30, and the electric motor 34 is electrically connected to a generator 36 via at least one electrical signal path 35. The turbocharger further includes a bearing housing 70 which may house shaft 30 and include one or more bearing as known in the art. In this example, the bearing housing 70 also houses the electric motor 34, although in other examples the bearing housing 70 does not house electric motor 34. The generator is mechanically driven by the engine 12, e.g., by the crankshaft (not shown) of the engine 12, and is operable in a conventional manner to convert rotation of the crankshaft of the engine 12 to electrical energy, and to supply such electrical energy to the electric motor 34. The electric motor 34 is operable, when enabled, to be responsive to the electrical energy supplied by the generator 36 to apply a drive torque to the turbocharger shaft 30 for the purpose of selectively increasing the rotational speed of the shaft 30. Because the flow rate of air passing through the compressor 16 is directly proportional to the rotational speed of the wheel or disk of the compressor 16, one purpose of the electric motor 34 is to provide the turbocharger 18 with the ability to build boost pressure very quickly within the intake air conduit 20 and thus provide for the ability to very quickly increase the flow rate of fresh air to the engine 12 such as during transient operating conditions of the engine 12 and air handling system 10.

The air handling system 10 further includes an exhaust gas recirculation (EGR) fluid passageway 38 fluidly coupled between the exhaust gas passageway 28 and the intake air passageway 20. An EGR cooler 40 may be disposed in-line with the EGR passageway 38 for the purpose of cooling exhaust gas flowing through the EGR passageway 38, and an EGR control valve 42 is disposed in-line with the EGR passageway 38 between the EGR cooler 40 and the intake air passageway 20. The EGR control valve 42 is illustratively a conventional valve that can be electrically controlled in a conventional manner to selectively control the flow rate of exhaust gas passing from the exhaust gas passageway 28 to the intake manifold 14 via the intake air passageway 20. Intake fluid supplied to the intake manifold 14 of the engine 12 by the air handling system 10 is typically referred to as a "charge" and is understood to include fresh air, or air charge, supplied through the compressor 16 of the turbocharger 18 to the air intake passageway 20 and under some operating conditions of the engine 12 recirculated exhaust gas supplied through the EGR passageway 38 to the air intake passageway 20.

In the illustrated embodiment, the air handling system 10 further includes a control circuit 50 including a memory 52 having instructions stored therein that are executable by the control circuit 50 to control operation of at least the air handling system 10, and in some embodiments the control circuit 50 is operable to also control overall operation of the engine 12. The control circuit 50 illustratively includes a conventional processor, e.g., a microprocessor, which may be programmed as illustrated and described herein to control operation of the air handling system 10 as also described herein. The control circuit 50 has a number, N, of inputs OP for receiving signals from N corresponding conventional sensors associated with the air handling system 10 and also with the engine 12 via N corresponding signal paths 60. The memory 52 further includes conventional instructions stored therein that are executable by the control circuit 50 to process the sensor signals produced by the N sensors to determine corresponding air handling system and/or engine operating parameters. Examples of such sensors that may be included with the air handling system 10/engine 12 and their associated operating parameters include, but are not limited to, any one or combination of a compressor inlet temperature sensor configured to produce a signal corresponding to the temperature of fresh air entering the inlet of the compressor 16, i.e., ambient air temperature, a compressor inlet pressure sensor configured to produce a signal corresponding to the pressure of air entering the inlet of the compressor 16, i.e., ambient air pressure, a compressor inlet flow rate sensor configured to produce a signal corresponding to the flow rate of fresh air entering the inlet of the compressor 16, a boost pressure sensor configured to produce a signal corresponding to charge pressure within the air intake passageway 20 and intake manifold 14, a flow rate sensor configured to produce a signal corresponding to the flow rate of fresh air supplied by the compressor 16 to the intake manifold 14 and flowing through the intake air passageway 20, an intake manifold temperature sensor configured to produce a signal corresponding to the temperature of the charge entering the engine 12 via the intake manifold 14, a speed sensor configured to produce a signal corresponding to rotational speed of the turbocharger shaft 30, a speed sensor configured to produce a signal corresponding to rotational speed of the engine 12, a differential pressure sensor configured to produce a signal corresponding to the pressure differential across the EGR valve 42 or other flow restriction disposed in-line with the EGR fluid passageway 38, a temperature sensor configured to produce a temperature signal corresponding to the temperature of recirculated exhaust gas flowing through the EGR fluid passageway 38 and/or exiting the EGR cooler 40, a pressure sensor configured to produce a signal corresponding to the pressure of exhaust gas exiting the EGR cooler 40, a flow rate sensor configured to produce a signal corresponding to the flow rate of recirculated exhaust gas flowing through the EGR passageway 38, a pressure sensor configured to produce a signal corresponding to exhaust gas pressure at the outlet of the turbine 24, an exhaust gas temperature sensor configured to produce a signal corresponding to the temperature of exhaust gas produced by the engine 12, a temperature sensor configured to produce a signal corresponding to the operating temperature of the engine 12, e.g., the temperature of engine coolant fluid circulating through the engine 12, and the like. Although such one or combination of such sensors is/are not specifically illustrated in the drawings, those skilled in the art will recognize that such one or more sensors are conventional and that various combinations of such sensors will typically be included in conventional engine and/or air handling control systems and therefore need not be specifically shown in the drawings.

In the embodiment illustrated in FIG. 1, the control circuit 50 further includes a number of outputs electrically connected to various actuators associated with the air handling system 10. For example, the control circuit 50 includes an EGR valve output, EGRV, which is electrically connected to an actuator of the EGR valve 42 via a signal path 62. The memory 52 has instructions stored therein that are executable by the control circuit 50 to control the position of the EGR valve relative to a reference position, e.g., relative to a fully open or fully closed position, by controlling the actuator of the EGR valve 42 via selective control of the actuator signal, i.e., EGR valve control signal, produced on the signal path 62 to thereby control the flow rate of recirculated exhaust gas through the EGR fluid passageway 38 in a conventional manner. The control circuit 50 further includes an electric motor enable output, EB, which is electrically connected to an enable input of the electric motor 34 via a signal path 64. The memory 52 has instructions stored therein that are executable by the control circuit 50 to selectively produce an enable signal on the signal path 64 to thereby selectively enable operation of the electric motor 34 to rapidly increase the rotational speed of the compressor 16, so that boost pressure supplied by the compressor 16 is accordingly rapidly increased, as will be described in greater detail hereinafter. The control circuit 50 further includes a variable geometry turbocharger output, VGT, which is electrically connected to a conventional variable geometry actuator of the turbocharger turbine 24 via a signal path 66. The memory 52 has instructions stored therein that are executable by the control circuit 50 to selectively control the geometry of the turbine 24, i.e., the exhaust gas swallowing capacity of the turbine 24, in a conventional manner by controlling the variable geometry actuator of the turbocharger turbine 24 via selective control of a VGR control signal produced on the signal path 66.

The air handling system 10 may, in some embodiments, illustratively include one or more additional actuators. For example, in some embodiments the air handling system 10 may include an intake assist throttle positioned in-line with the air intake conduit 20 for the purpose of modulating fresh air flow through the engine system as described hereinabove. In some embodiments the air handling system 10 may alternatively or additionally include a turbine bypass valve fluidly coupled between the exhaust conduits 28 and 32 for the purpose of selectively diverting exhaust gas around the turbine 24 to thereby modulate the energy applied to the turbine 24 as described hereinabove. It will be understood that while such one or more additional actuators are not shown in FIG. 1, such actuators are known in the art and may be provided and implemented in the form of conventional actuators.

Figure 2:
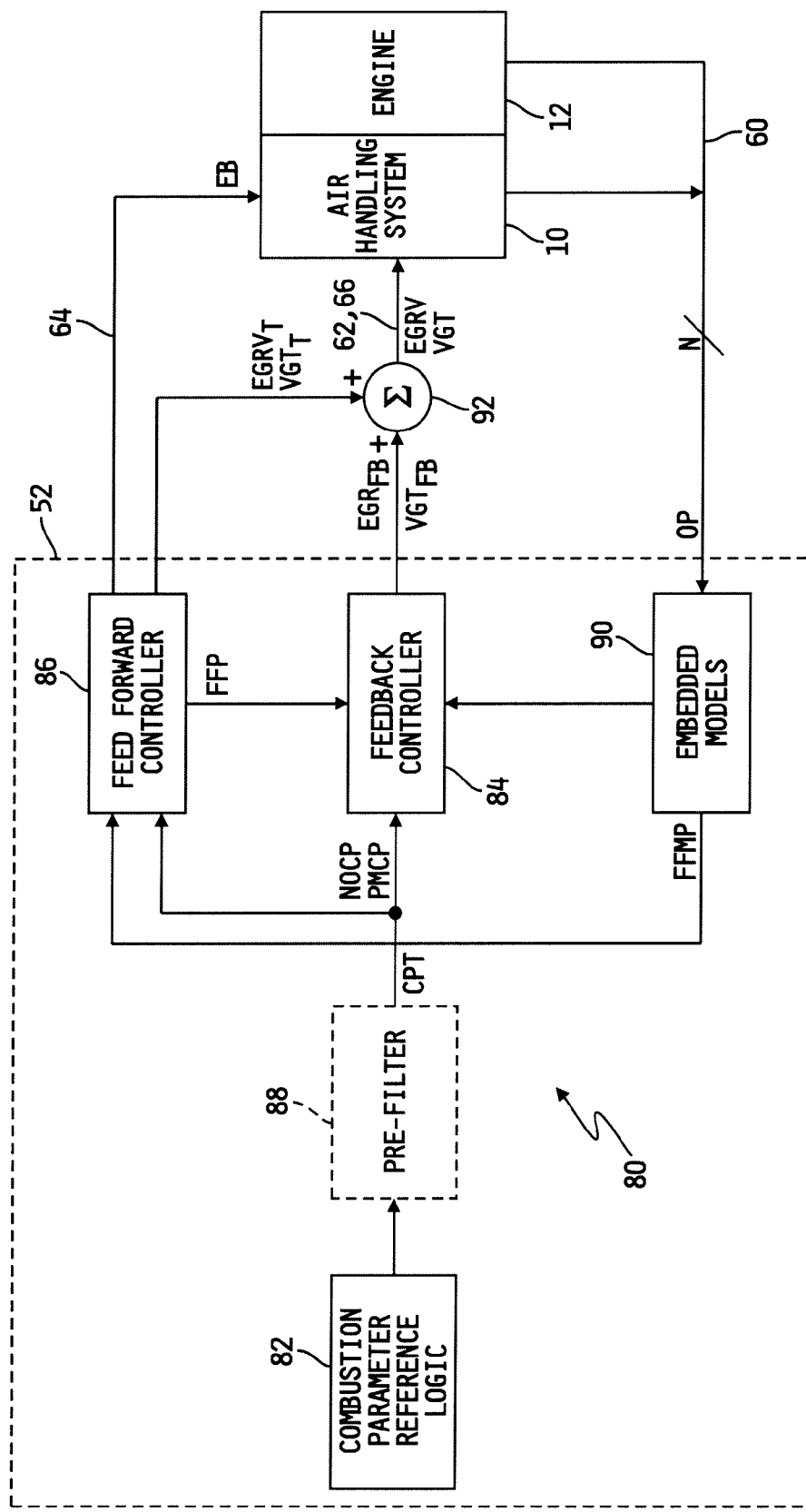
FIG. 2 is a block diagram of one illustrative embodiment of a control structure stored in the memory of the control circuit of FIG. 1 and that is executable by the control circuit to control operation of the air handling system.

Referring now to FIG. 2, one illustrative embodiment of a control structure 80 is shown for controlling the operation of the air handling system 10 illustrated in FIG. 1. The control structure 80 is illustratively stored in the memory 52 in the form of instructions that are executable by the control circuit 50 to control operation of the air handling system 10 as will be described hereinafter. In the illustrated embodiment, the control structure 80 includes a combustion parameter reference logic block 82 that produces conventional control parameter targets, CPT, in the form of, for example, at least a NOx emission control parameter, NOCP, and a particulate matter control parameter, PMCP, which are provided to a feedback controller 84 and also to a feed forward controller 86. Illustratively, NOCP and PMCP are surrogates for the NOx and particulate matter control parameters respectively, and examples of CPT generally and of NOCP and PMCP specifically, include, but are not limited to, one or any combination of recirculated exhaust gas flow rate, EGRFR, fresh air flow rate, FAF, charge flow rate, MCF, boost pressure, BOOST, oxygen content of exhaust gas (02), intake $O_2$ mole fraction and air-to-fuel ratio, AFR. Optionally, as illustrated in FIG. 2 in phantom, the control structure 80 may further include a pre-filter block 88 interposed between the combustion parameter reference logic block 82 and the feedback/feedforward controllers 84 and 86 respectively. The pre-filter block 88, if included, is illustratively used to modify the desired reference targets, i.e., the control parameter targets, CPT, based on the system response so that the system will produce the desired reference target values.

The feedback controller 84 generally receives one or more feedforward operating parameters, FFP, from the feedforward controller 86, e.g., in the form of one or more target operating parameters. The control structure 80 further includes an embedded models block 90, and operating parameters, OP, produced by the N different sensors associated with the air handling system 10 and/or engine 12 are provided to the embedded models block via the N signal paths 60. The embedded models block 90 includes a number of mathematical models that each produce a different model parameter based on one or more of the operating parameters, OP. Examples of some of the models included in the embedded models block include, but are not limited to, EGR valve position, EGRVFB, VGT rack position, VGTFB, exhaust manifold pressure, EMPFB, modeled NOx emission parameter, NOFB (modeled NOx emission value, corresponding to NOCP, which is based on one or more measured or otherwise monitored operating parameters, OP), particulate matter parameter, PMFB (modeled particulate matter value, corresponding to PMCP, which is based on one or more measured or otherwise monitored operating parameters, OP), compressor inlet temperature, CIT, and compressor inlet pressure, CIP. The embedded models 90 provide one or more such model values in the form of one or more feedback model parameters, FBMP, to the feedback controller 84, and provide one more model values in the form of one or more feedforward model parameters, FFMP, to the feedforward controller 86. In any case, the feedback controller 84 produces a feedback component, $EGR_{FB}$ of the EGR valve control signal, EGRV, and a feedback component, $VGT_{FB}$ of the VGT control signal, VGT, and provides these values to a summation block 92. The feedforward controller 86 likewise produces a feedforward or target component, $EGR_T$, of the EGR valve control signal, EGRV, and feedforward or target component, $VGT_T$ of the VGT control signal, VGT, and provides these values to the summation block 92. The summation block 92 combines the sum of $EGR_{FB}$ and $EGR_T$ to produce the EGR valve control signal, EGRV on the signal path 62, and likewise combines the sum of $VFT_{FB}$ and $VGT_T$ to produce the VGT control signal, VGT, on the signal path 66. The feedforward controller 86 also selectively produces the electric motor enable signal, EB, on the signal path 64.

Figure 3:
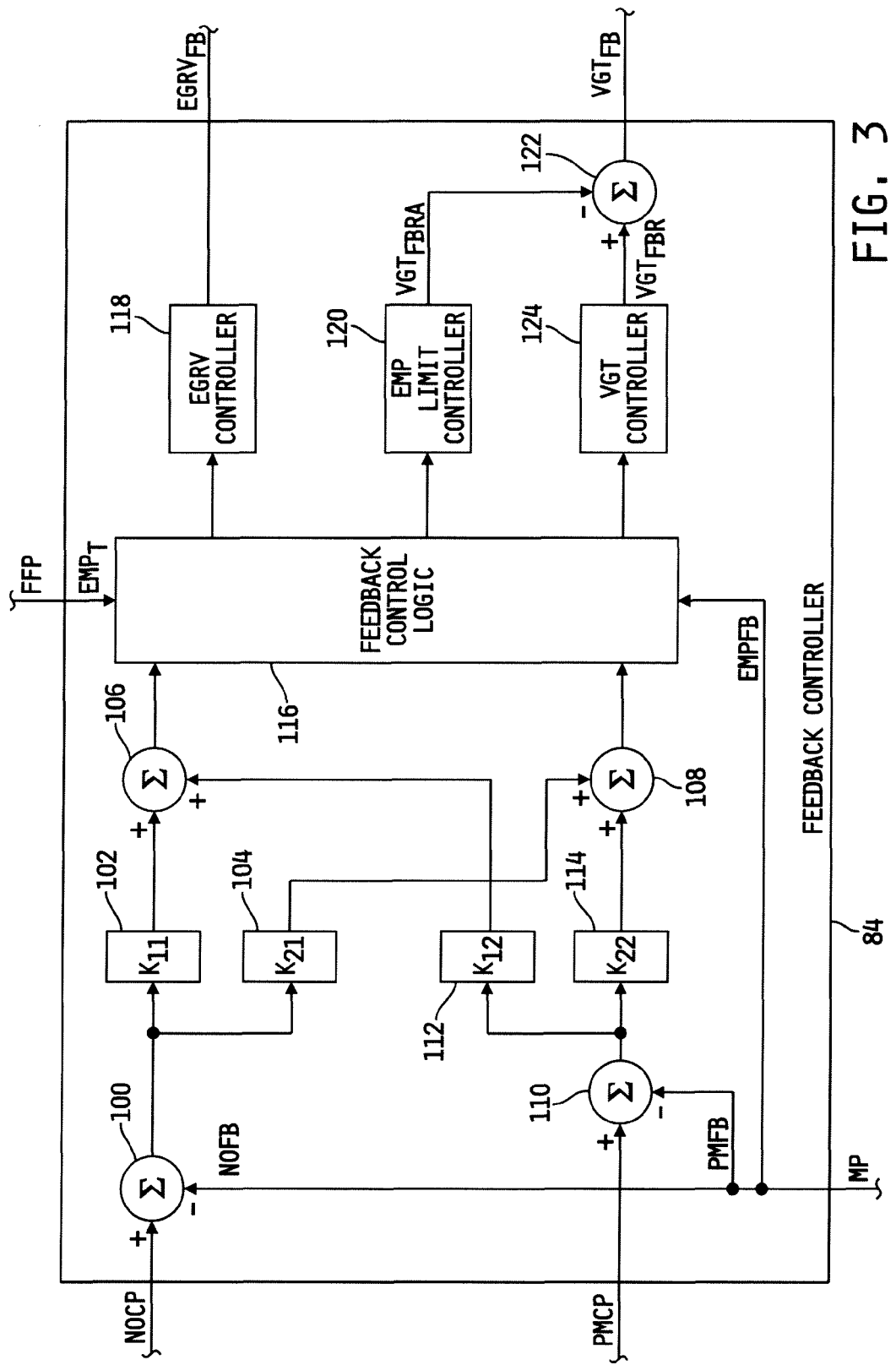
FIG. 3 is a block diagram of one illustrative embodiment of the feedback controller illustrated in FIG. 2.

Referring now to FIG. 3, one illustrative embodiment of the feedback controller 84 illustrated in FIG. 2 is shown. In the illustrated embodiment, the feedback controller 84 includes a summation node 100 having an additive input receiving the NOx emissions control parameter, NOCP, and a subtractive input receiving the modeled NOx emissions parameter, NOFB, and an output producing the value NOCP−NOFB. The output of the summation node 100 is provided to first and second weighting parameter multiplication blocks 102 and 104 respectively. The multiplication block 102 multiplies the output of the summation node 100 by a weighting parameter $K_{11}$, and the resulting value, $K_{11}$*(NOCP−NOFB) is provided to an additive input of another summation node 106. The multiplication block 104 similarly multiplies the output of the summation node 100 by a weighting parameter $K_{21}$, and the resulting value, $K_{21}$*(NOCP−NOFB) is provided to an additive input of yet another summation node 108. The feedback controller 84 further includes another summation node 110 having an additive input receiving the particulate matter control parameter, PMCP, and a subtractive input receiving the modeled particulate matter parameter, PMFB, and an output producing the value PMCP−PMFB. The output of the summation node 110 is provided to third and fourth weighting parameter multiplication blocks 112 and 114 respectively. The multiplication block 112 multiplies the output of the summation node 110 by a weighting parameter $K_{12}$, and the resulting value, $K_{12}*(PMCP−PMFB)$ is provided to another additive input of the summation node 106. The output of the summation node 106, $K_{11}*(NOCP−NOFB)+K_{12}*(PMCP−PMFB)$, is provided to one input of a feedback control logic block 116. The multiplication block 114 similarly multiplies the output of the summation node 110 by a weighting parameter $K_{22}$, and the resulting value, $K_{22}*(PMCP−PMFB)$ is provided to another additive input of the summation node 108. The output of the summation node 108, $K_{21}*(NOCP−NOFB)+K_{22}*(PMCP−PMFB)$, is provided to another input of the feedback control logic block 116.

In the illustrated embodiment, a single feedforward parameter, FFP, e.g., target exhaust manifold pressure, $EMP_T$, is also provided as an input to the feedback control logic block 116, as is the corresponding model parameter (FBMP) in the form of the measured or modeled exhaust manifold pressure value EMPFB. An output of the feedback control logic block 116 is provided as an input to an EGRV controller 118, the output of which is the feedback component of EGR valve control signal, $EGRV_{FB}$, on the signal path 62. Another output of the feedback control logic block 116 is provided as an input to an exhaust manifold pressure (EMP) limit controller 120, the output of which is a VGT rack position adjustment value, $VGT_{FBRA}$, and is provided to a subtractive input of a summation node 122, and yet another output of the feedback control logic block 116 is provided as an input to a VGT controller 124, the output of which is a VGT rack position value, $VGT_{FBR}$, and is provided to an additive input of the summation node 122. The output of the summation node 122 is the feedback component of the VGT control signal, $VGT_{FB}$, on the signal path 66, and represents the output of the VGT controller 124 limited by the output of the EMP limit controller 122, or $VGT_{FB}=VGT_{FBR}-VGT_{FBRA}$.

The feedback controller 84 is used in a conventional manner to reduce system performance variability by continually correcting for model errors and compensating for unknown disturbances. The feedback controller 84 illustrated in FIG. 3 is illustratively structured with generic inputs, NOCP and PMCP, and incorporates weighting compensators or parameters, $K_{11}$, $K_{12}$, $K_{21}$ and $K_{22}$ that may be calibrated such that NOCP or PMCP wins in situations where both reference targets cannot be achieved simultaneously. In the feedback controller 84 illustrated in FIG. 3, the generic air handling control spaces are represented as the NOx control parameter, NOCP and the particulate matter control parameter, PMCP. The NOx emissions control parameter, NOCP, and the modeled NOx emissions parameter, NOFB, represent the control parameter that strongly correlates with NOx emissions, and the particulate matter control parameter, PMCP, and the modeled particulate matter parameter, PMFB, represent the control parameter that strongly correlates with particulate emissions. The weighting parameters, $K_{11}$, $K_{12}$, $K_{21}$ and $K_{22}$ represent the sensitivity between the corresponding actuator command and the control variable. In one illustrative example, NOCP may be an EGR flow rate target, EGRFR, and NOFB may be the modeled or measured EGR flow rate, and PMCP may be a charge flow rate target and PMFB may be the modeled or measured charge flow rate. In this illustrative example, $K_{11}$ may represent the extent of closing the EGR valve 42 to increase boost by speeding up the rotational speed of the turbocharger 18, and $K_{21}$ may represent the extent of using the VGT to build back pressure for EGR flow. Similarly, $K_{21}$ may represent the position of the EGR valve 42 to achieve the charge flow target while $K_{22}$ may represent the position of the VGT actuator to achieve the same. The weighting compensators or parameters, $K_{11}$, $K_{12}$, $K_{21}$ and $K_{22}$, may be constants, linearly dynamic or non-linearly dynamic.

Illustratively, partial derivatives can be used to estimate the weighting factors at a given engine operation as follows:

$K_{11} = \partial uNOx/\partial NOCP$ $K_{12} = \partial uNOx/\partial PMCP$ $K_{21} = \partial uPM/\partial NOCP$ $K_{22} = \partial uPM/\partial PMCF$, where, uNOx is the NOx control actuation command, e.g., EGRV, and uPM is the particulate matter control actuation command, e.g., VGT.

The feedback control logic block 116 contains control logic for selecting the error signals to be fed to the various controllers 118, 120 and 124. In the illustrated embodiment, for example, the EGR valve control error, $E_{EGRVC}$, provided as the input to the EGRV controller 118 is set by the logic block 116 to the value of the output of the summation block 106, i.e., $E_{EGRVC}=K_{11}*(NOCP−NOFB)+K_{12}*(PMCP−PMFB)$. The EGRV controller 118 is illustratively a PID controller producing the feedback component of the EGRV control signal, $EGRV_{FB}$, according to the equation $EGRV_{FB}=K_{EGRp}*E_{EGRVC}+K_{EGRi}*\int E_{EGRVC}\ dt)+K_{EGRd}*dE_{EGRVC}/dt$, where $K_{EGRp}$ is the proportional gain, $K_{EGRi}$ is the integral gain and $K_{EGRd}$ is the derivative gain. It will be understood that the EGRV controller 118 may alternatively be provided in the form of another conventional controller such as a PI controller or other known controller.

In the illustrated embodiment, the VGT control error, $E_{VGTC}$, provided as the input to the VGT controller 124 is set by the logic block 116 to the value of the output of the summation block 108, i.e., $E_{VGTC}=K_{21}*(NOCP−NOFB)+K_{22}*(PMCP−PMFB)$. The VGT controller 124 is illustratively a PID controller producing a feedback component of the VGT rack position control signal, $VGT_{FBR}$, according to the equation $VGT_{FBR}=K_{VGTp}*E_{VGTC}+K_{VGTi}*\int E_{VGTC}\ dt)+K_{VGTd}*dE_{VGT}C/dt$, where $K_{VGTp}$ is the proportional gain, $K_{VGTi}$ is the integral gain and $K_{VGTd}$ is the derivative gain. It will be understood that the VGT controller 124 may alternatively be provided in the form of another conventional controller such as a PI controller or other known controller.

In the illustrated embodiment, the exhaust manifold pressure control error, $E_{EMPC}$, provided as the input to the EMP limit controller 120 is set by the logic block 116 to the value of the difference between the exhaust manifold pressure target, $EMP_T$ and the measured or modeled value of the exhaust manifold pressure, EMPFB, or $E_{EMPC}=EMP_T-EMPFB$. The EMP limit controller 120 is illustratively a PID controller producing a VGT rack position adjustment signal, $VGT_{FBRA}$, according to the equation $VGT_{FBRA}=K_{EMPp}*E_{EMPC}+K_{EMPi}*\int E_{EMPC}\ dt)+K_{EMPd}*dE_{EMPC}/dt$, where $K_{EMPp}$ is the proportional gain, $K_{EMPi}$ is the integral gain and $K_{EMPd}$ is the derivative gain. It will be understood that the EMP limit controller 120 may alternatively be provided in the form of another conventional controller such as a PI controller or other known controller. In any case, the feedback component of the VGT control signal, $VGT_{FB}$, is the difference between $VGT_{FBR}$ and $VGT_{FBRA}$, or $VGT_{FB} = VGT_{FBR} - VGT_{FBRA}$.

It will be understood that in embodiments of the air handling system 10 that include one or more additional actuators as described hereinabove, the feedback controller 84 may likewise include one or more additional controllers that receive error inputs from the feedback control logic block 116. For example, in some embodiments the air handling system 10 may include an intake assist throttle positioned in-line with the air intake conduit 20 for the purpose of modulating fresh air flow through the engine system as described hereinabove. In such embodiments, the feedback controller 84 may include an intake assist throttle feedback controller receiving an intake assist throttle controller parameter error from the logic block 116, which may be the output of the summation node 106 under some operating conditions and the output of the summation node 108 under other operating conditions, and producing a feedback component of an intake assist throttle control signal according to a PID function as described hereinabove or according to a PI or other known controller function. In some embodiments the air handling system 10 may alternatively or additionally include a turbine bypass valve fluidly coupled between the exhaust conduits 28 and 32 for the purpose of selectively diverting exhaust gas around the turbine 24 to thereby modulate the energy applied to the turbine 24 as described hereinabove. In such embodiments, the feedback controller 84 may include a turbine bypass valve feedback controller receiving a turbine bypass valve controller parameter error from the logic block 116, which may be, for example the difference between a target and measured (or modeled) turbocharger rotational speed under some operating conditions and the output of the summation node 108 under other operating conditions, and producing a feedback component of a turbine bypass valve control signal according to a PID function as described hereinabove or according to a PI or other known controller function.

Figure 4:
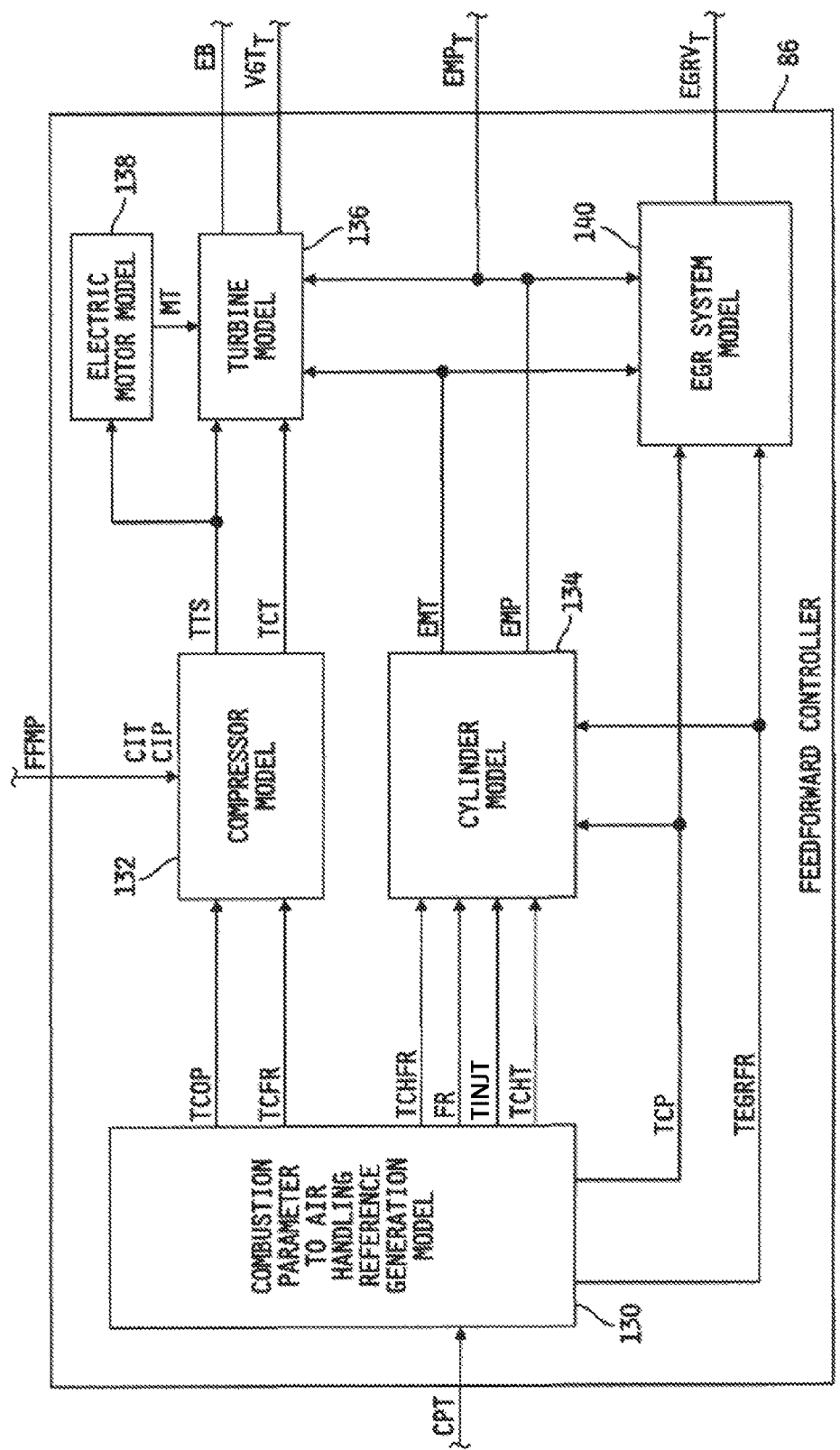
FIG. 4 is a block diagram of one illustrative embodiment of the feedforward controller illustrated in FIG. 2.

Referring now to FIG. 4, one illustrative embodiment of the feedforward controller 86 illustrated in FIG. 2 is shown. In the illustrated embodiment, the feedforward controller 86 includes a combustion parameter to air handling reference generation model 130 that receives as inputs the various control parameter targets, CPT, produced by the combustion parameter reference logic block 82 of FIG. 2. The combustion parameter to air handling reference generation model includes a number of conventional equations, maps, lookup tables or the like that translate or otherwise convert combustion references included in the CPT, e.g., fresh air flow rate, charge flow rate, EGR flow rate and intake 02 mole fraction, to turbocharger-machinery references or targets such as a target compressor outlet pressure, TCOP, and a target compressor flow rate, TCFR, and cylinder and manifold references or targets such as a target charge flow rate, TCHFR, a target fueling rate, FR, a target injection timing, TINJT, a target charge temperature, TCHT, a target charge pressure, TCP, and a target EGR flow rate, TEGRFR. The feedforward controller 86 further includes a compressor model 132 that receives as inputs the target compressor outlet pressure, TCOP, and the target compressor flow rate, TCFR, and in the illustrated embodiment further receives as inputs from the embedded models 90 feedforward model parameters, FFMP, in the form of measured or modeled values of a compressor inlet temperature, CIT, and a compressor inlet pressure, CIP. The compressor model 132 includes an embedded model of the compressor 16 to determine a target compressor rotational speed, which is the same as the turbine rotational speed and is therefore labeled in FIG. 4 as a target turbocharger speed, TTS, and a target compressor torque, TCT. Further details relating to one illustrative embodiment of the compressor model 132 will be described hereinafter with respect to FIGS. 5-7.

The feedforward controller 86 further includes a cylinder model 134 that receives as inputs the target charge flow rate, TCHFR, a target fueling rate, FR, a target injection timing, IT, a target charge temperature, TCHT, a target charge pressure, TCP, and a target EGR flow rate, TEGRFR produced by the combustion parameter to air handling reference generation model 130. The cylinder model 134 includes a model that estimates desired (target) exhaust manifold temperature, EMT, (i.e., turbine inlet temperature) and desired (target) exhaust manifold pressure, EMP, (i.e., turbine inlet pressure) from the foregoing air handling and fuel injection references. Further details relating to one illustrative embodiment of the cylinder model 134 is described in co-pending U.S. patent application Ser. No. 13/244,550, the disclosure of which is incorporated herein by reference in its entirety.

The feedforward controller 86 further includes a turbine model 136 that receives as inputs the target turbocharger speed, TTS, and the target compressor torque, TCT, produced by the compressor model 132, as well as the target exhaust manifold temperature, EMT, and the target exhaust manifold pressure target, EMP, produced by the cylinder model 134. The target turbocharger speed, TTS, is further provided as an input to an electric motor model 138, and the electric motor model 138 includes a model that converts the target turbocharger speed value, TTS, to a target motor torque value, TMT, corresponding to an amount of torque that the electric motor 34 will produce based on the target turbocharger speed, TTS. Further details relating to one illustrative embodiment of the electric motor model 138 will be described hereinafter with respect to FIG. 8. In any case, the target motor torque value, TMT, produced by the electric motor model 138 is provided as an additional input to the turbine model 136. The turbine model 136 illustratively includes an embedded model of the turbine 24 to estimate turbine torque at different VGT rack positions and then determine the desired VGT rack position command, VGT, which will, when supplied to the VGT actuator via the signal path 66, cause the turbocharger 18 to satisfy the target compressor torque, TCT, if it is possible to do so. The turbine model 136 further illustratively includes logic that enables the electric motor 34 when the target compressor torque, TCT, cannot be met in any rack position. Further details relating to one illustrative embodiment of the turbine model 136 will be described in detail hereinafter with respect to FIGS. 9-14.

The feedforward controller 86 further includes an EGR system model 140 that receives as inputs the target charge pressure, TCP, and the target EGR flow rate, TEGRFR, produced by the combustion parameter to air handling reference generation model 130, as well as the target exhaust manifold temperature, EMT, and the target exhaust manifold pressure target, EMP, produced by the cylinder model 134. The EGR system model 140 includes a model that illustratively uses conventional momentum and Bernoulli equations to determine a position of the EGR valve 42 relative to a reference position that will meet the EGR flow reference targets, and to produce a corresponding EGR valve target signal, $EGR_T$.

Figure 5:
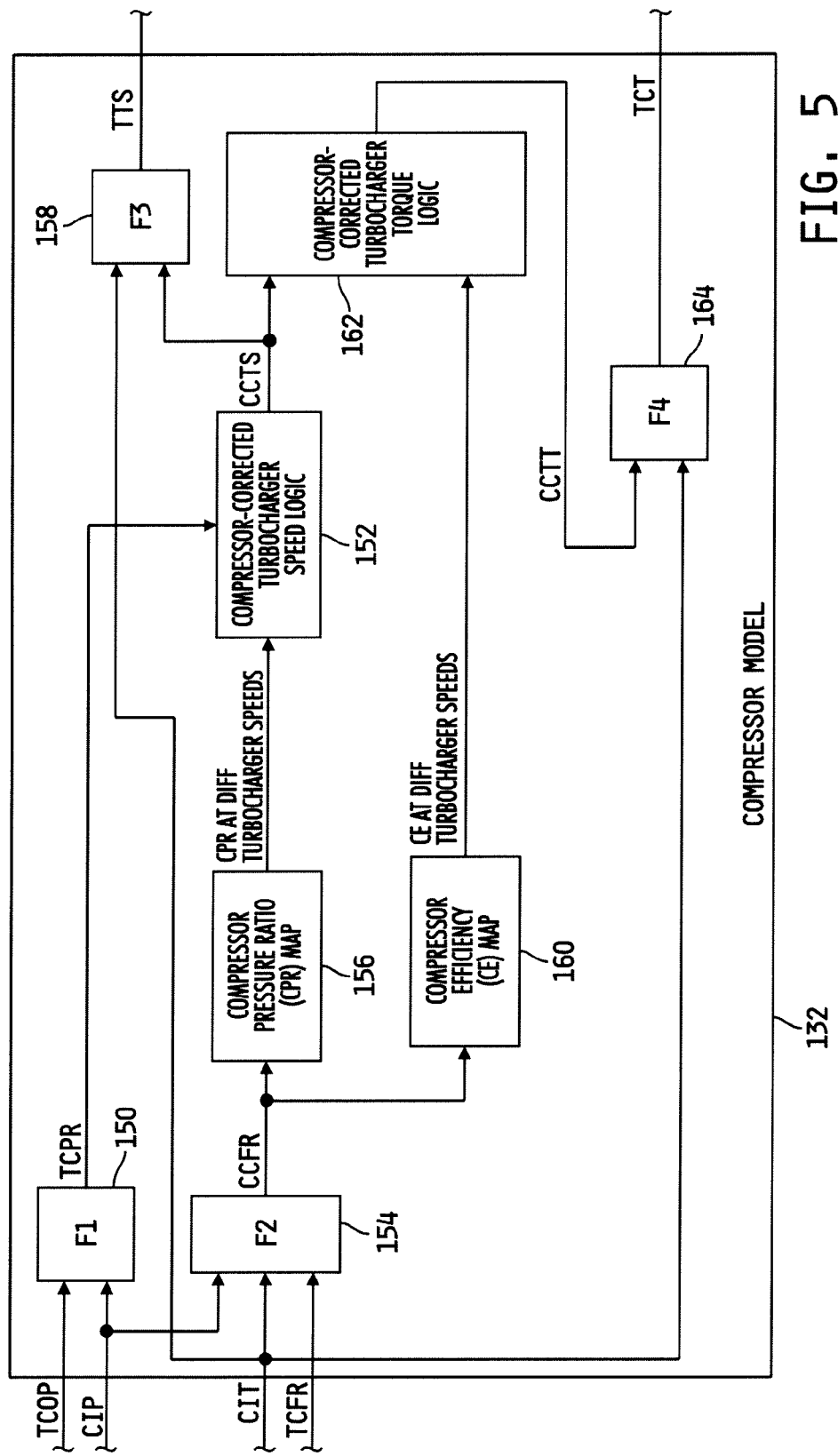
FIG. 5 is a block diagram of one illustrative embodiment of the compressor model illustrated in FIG. 4.

Referring now to FIG. 5, one illustrative embodiment of the compressor model 132 illustrated in FIG. 4 is shown. In the illustrated embodiment, the compressor model 132 includes a function block 150 receiving as inputs the target compressor outlet pressure, TCOP, and the compressor inlet pressure, CIP, and producing as an output a target compressor pressure ratio, TCPR. Illustratively, the function, F1, stored in the function block 150 produces TCPR in accordance with the equation TCPR=TCOP/CIP. The target compressor ratio, TCPR, is provided as an input to a compressor-corrected turbocharger speed logic block 152. The compressor model 132 further includes another function block 154 receiving as inputs the compressor inlet pressure, CIP, the compressor inlet temperature, CIT, and the target compressor flow rate, TCFR, and produces as an output a compressor corrected compressor flow rate CCCFR. Illustratively, the function, F2, stored in the function block 154 produces CCCFR in accordance with the equation CCCFR=TCFR*SQRT(CIT/$T_{STD}$)*(CIP/$P_{STD}$), where $T_{STD}$ is a standard reference temperature, e.g., 25 degrees C. or other reference temperature, and $P_{STD}$ is a standard reference pressure, e.g., 101.3 kPa or other reference pressure. Alternatively, this disclosure contemplates other embodiments in which F1 and/or F2 includes more, fewer and/or different input parameters.

The compressor corrected compressor flow rate, CCCFR, is provided as an input to another functional block 156 that illustratively has stored therein a conventional compressor pressure ratio map corresponding to the specific configuration of the turbocharger 18. Generally, the compressor pressure ratio map is designed to map values of CCCFR to compressor pressure ratio values at a plurality of different turbocharger operating speeds. The functional block 156 is illustratively operable to process CCCFR using the compressor pressure map to generate a number of pairs of compressor pressure ratio and turbocharger operating speed values.

Figure 6:
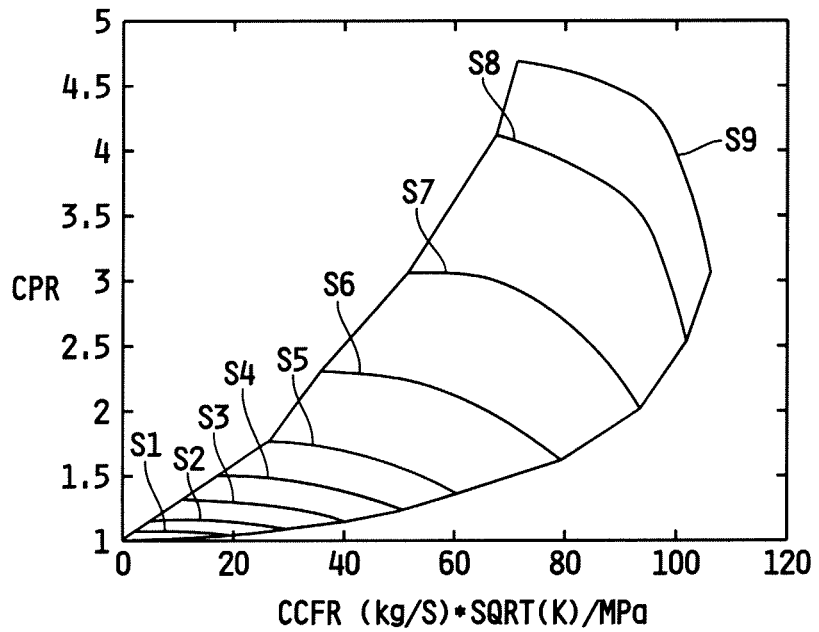
FIG. 6 is a plot of one illustrative example of the compressor pressure ratio map illustrated in FIG. 5.

Referring now to FIG. 6, an example of one such compressor pressure ratio map is shown. In the illustrated embodiment, the compressor pressure ratio map maps compressor corrected compressor flow rate values, CCCFR, to compressor pressure ratio values, CPR, at a plurality of different turbocharger operating speeds, where the contours $S_1$-$S_9$ represent lines of different, constant turbocharger operating speeds. With the compressor pressure ratio map, any one value of CCCFR thus produces a number, M, of different compressor pressure ratio, CPR, and turbocharger operating speed, TS, pairs (CPR, TS)$_1$, . . . , (CPR, TS)$_M$, where M may be any positive integer.

Referring again to FIG. 5, the target compressor pressure ratio, TCR, produced by the functional block 150 and the number of pairs of compressor pressure ratio and turbocharger operating speed values, (CPR, TS)$_{1-M}$, produced by the functional block 156 are provided as inputs to another functional block 152. The functional block 152 processes a function of at least two of the (CPR, TS)$_{1-M}$ pair values and the TCR value to produce a compressor-corrected turbocharger speed estimate, CCTS. In one embodiment, for example, two of the (CPR, TS)$_{1-M}$ pair values are selected with one pair having a CPR value that is less than TCR and the other pair having a CPR value that is greater than TCR, and a conventional interpolation technique is used to determine a CCTS value that corresponds to TCR. In embodiments in which the function of the two (CPR, TS)$_{1-M}$ pair values is linear, or can be acceptably approximated by a linear function, a conventional linear interpolation technique may be used to determine CCTS. Alternatively, in embodiments in which the function of the two (CPR, TS)$_{1-M}$ pair values is non-linear, a conventional non-linear interpolation technique may be used to determine CCTS.

In another example embodiment, the functional block 152 may be configured to process the number of (CPR, TS)$_{1-M}$ pair values to generate a continuous or piece-wise continuous profile of compressor-corrected turbocharger operating speeds as a function of compressor pressure ratios. The profile may illustratively be linear or non-linear. In this embodiment, the functional block 152 is then operable to map TCR to CCTS using the generated profile. It will be appreciated that one or more other conventional processing techniques may alternatively be used to process the number of (CPR, TS)$_{1-M}$ pair values and TCR to determine CCTS, and any such alternate processing techniques are contemplated by this disclosure.

The compressor model 132 illustrated in FIG. 5 further includes another functional block 158 that receives as inputs the compressor inlet temperature signal, CIT, and the compressor corrected turbocharger speed estimate, CCTS, and produces as an output an estimate of the target turbocharger speed, TTS. Illustratively, the functional block 158 processes CIT and CCTS according to a function F3 to produce an estimate of the target turbocharger speed, TTS, and in one illustrative embodiment the function F3 is given by the equation TTS=CCTS*SQRT(CIT/$T_{STD}$), where $T_{STD}$ is as described herein above.

The compressor corrected compressor flow rate, CCCFR, produced by the functional block 154 is also provided as an input to another functional block 160 that illustratively has stored therein a conventional efficiency map corresponding to the specific configuration of the turbocharger 18. Generally, the compressor efficiency map is designed to map values of CCCFR to compressor efficiency (percentage) values at a plurality of different turbocharger operating speeds. The functional block 160 is illustratively operable to process CCCFR using the compressor efficiency map to generate a number of pairs of compressor pressure ratio and turbocharger operating speed values.

Figure 7:
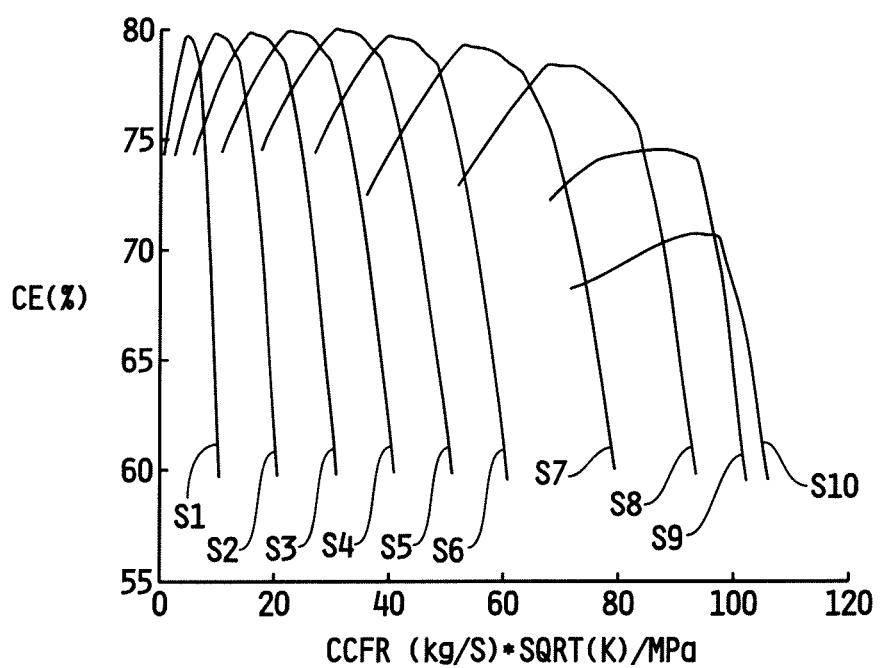
FIG. 7 is a plot of one illustrative example of the compressor efficiency map illustrated in FIG. 5.

Referring now to FIG. 7, an example of one such compressor efficiency map is shown. In the illustrated embodiment, the compressor efficiency map maps compressor corrected compressor flow rate values, CCCFR, to compressor efficiency values, CE, at a plurality of different turbocharger operating speeds, where the contours $S_1$-$S_{10}$ represent lines of different, constant turbocharger operating speeds. With the compressor pressure ratio map, any one value of CCCFR thus produces a number, K, of different compressor efficiency, CE, and turbocharger operating speed, TS, pairs (CE, TS)$_1$, . . . , (CE, TS)$_K$, where K may be any positive integer.

Referring again to FIG. 5, the compressor corrected turbocharger speed, CCTS, produced by the functional block 152 and the number of pairs of compressor efficiency and turbocharger operating speed values, (CE, TS)$_{1-K}$, produced by the functional block 160 are provided as inputs to another functional block 162. Similarly to the functional block 152, the functional block 162 processes a function of at least two of the (CE, TS)$_{1-K}$ pair values and the CCTS value to produce a compressor corrected turbocharger torque estimate, CCTT. In one embodiment, for example, two of the (CE, TS)$_{1-K}$ pair values are selected with one pair having a TS value that is less than CCTS and the other pair having a TS value that is greater than CCTS, and a conventional interpolation technique is used to determine a CCTT value that corresponds to CCTS. In embodiments in which the function of the two (CE, TS)$_{1-K}$ pair values is linear, or can be acceptably approximated by a linear function, a conventional linear interpolation technique may be used to determine CCTT. Alternatively, in embodiments in which the function of the two (CE, TS)$_{1-K}$ pair values is non-linear, a conventional non-linear interpolation technique may be used to determine CCTT. Alternatively still, the functional block 162 may be configured to process the number of $(CE, TS)_{1-K}$ pair values to generate a continuous or piece-wise continuous profile of compressor-corrected turbocharger operating torques as a function of compressor efficiencies, and such a profile can be processed as described above with respect to the functional block 152 to determine CCTT.

Referring again to FIG. 5, the compressor model 132 further includes another functional block 164 that receives as inputs the compressor inlet temperature signal, CIT, and the compressor corrected turbocharger torque estimate, CCTT, and produces as an output an estimate of the target compressor torque, TCT. Illustratively, the functional block 164 processes CIT and CCTT according to a function F4 to produce an estimate of the target compressor torque, TCT, and in one illustrative embodiment the function F4 is given by the equation $TCT=CCTT*SQRT(CIT/T_{STD})$, where $T_{STD}$ is as described herein above.

Figure 8:
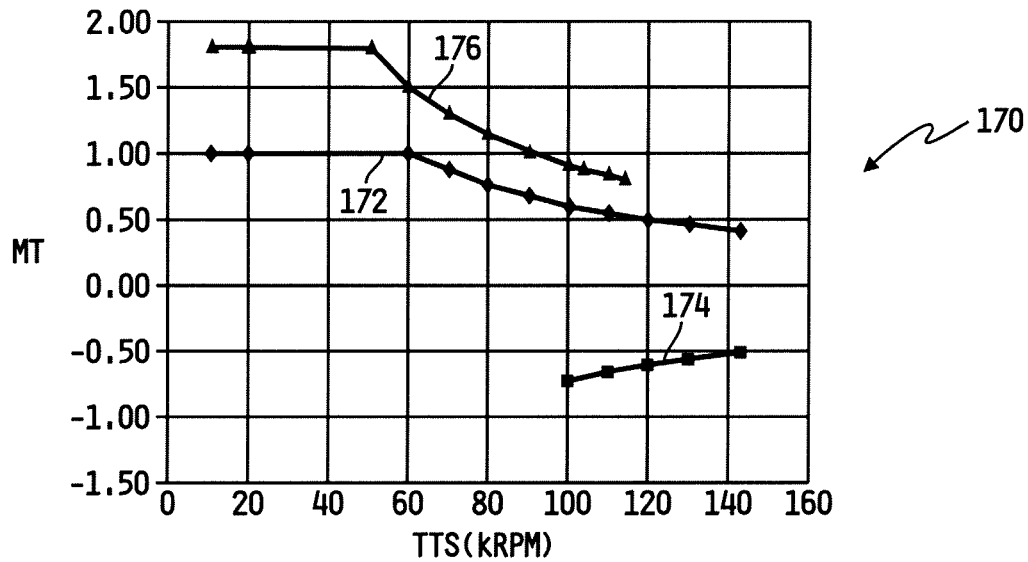
FIG. 8 is a plot of one illustrative example of the electric motor model illustrated in FIG. 4.

Referring now to FIG. 8, one illustrative embodiment of the electric motor model 134 is shown. In the illustrated embodiment, the electric motor model 134 includes a single functional block 170 receiving as an input the target turbocharger speed value, TTS, produced by the compressor model 132, and produces as an output the motor torque value, MT, corresponding to the torque applied by the electric motor 34 when the rotational speed of the turbocharger shaft 30 is TTS. The electric motor 34 is thus modeled as a torque generating device with the additional torque being used to supplement the torque produced by the turbine 24. Illustratively, the functional block 170 is provided in the form of a two-dimensional map that maps target turbocharger speed, TTS, to motor torque, MT. The electric motor map illustrated in FIG. 8 illustratively includes different speed/torque lines to illustrate motoring torque 172, generating torque 174 and combined motoring and generating torque 176.

Figure 9:
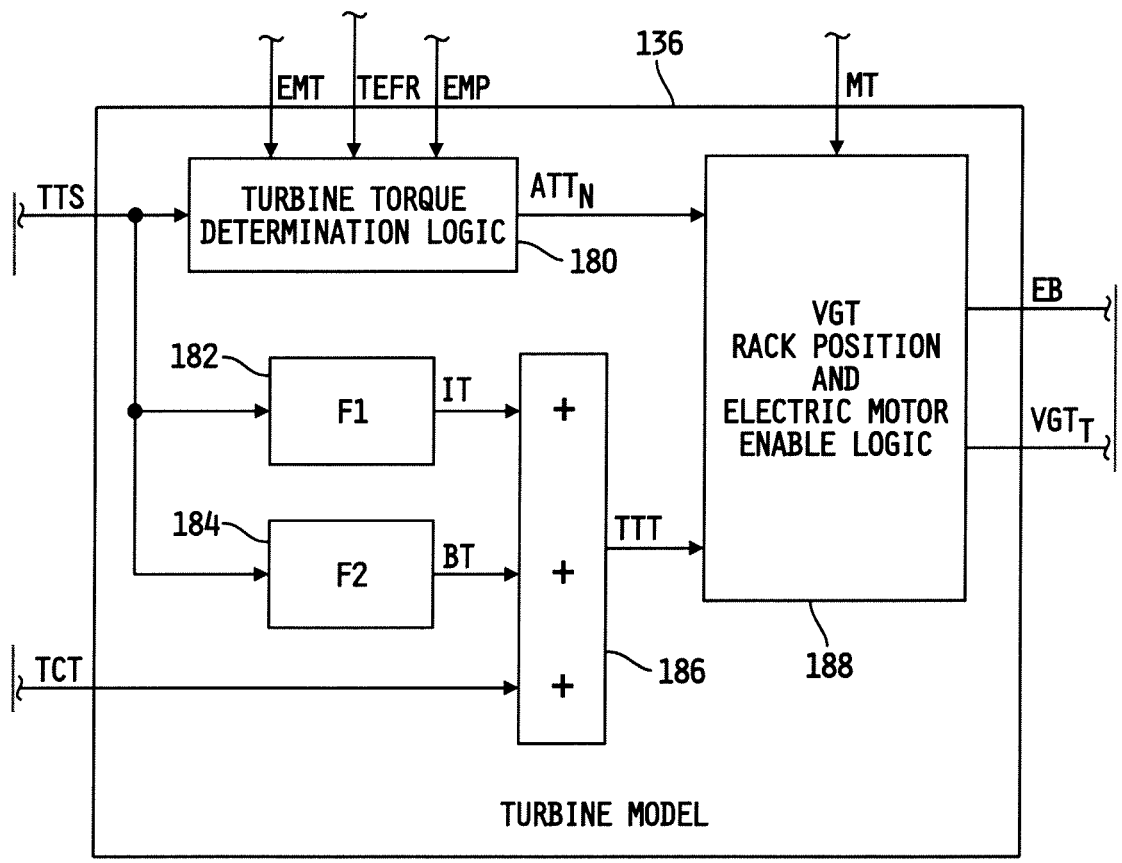
FIG. 9 is a block diagram of one illustrative embodiment of the turbine model illustrated in FIG. 4.

Referring now to FIG. 9, one illustrative embodiment of the turbine model 136 illustrated in FIG. 4 is shown. In the illustrated embodiment, the turbine model 136 includes a turbine torque determination logic block 180 receiving as inputs the target turbocharger speed value, TTS, produced by the compressor model 132, the target exhaust manifold temperature, EMT and the target exhaust manifold pressure, EMP, produced by the cylinder model 134, and a target exhaust flow rate value, EFR. Illustratively, EFR may be determined as a conventional function of the target exhaust manifold pressure, EMT, produced by the cylinder model 134, and/or as a function of the target charge flow rate, TCHFR, and the target EGR flow rate, TEGRFR, produced by the combustion parameter to air handling reference generation model 130. In any case, the turbine torque determination logic 180 is operable to process TTS and EFR and produce a number, N, of available turbine torque values, $ATT_N$, wherein each of the N ATT values corresponds to an available turbine torque at a different one of N possible rack positions, i.e., $ATT_1$ corresponds to an available turbine torque at rack position 1, $ATT_2$ corresponds to a different available turbine torque at rack position 2, etc.

Figure 10:
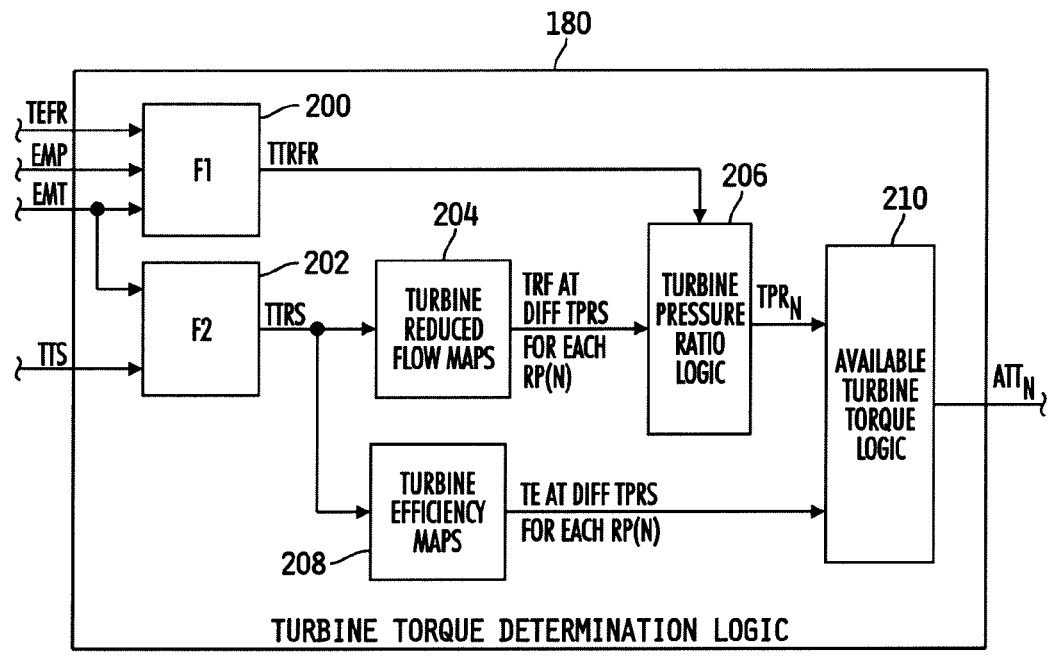
FIG. 10 is a block diagram of one illustrative embodiment of the turbine torque determination logic block illustrated in FIG. 9.

Referring now to FIG. 10, one illustrative embodiment of the turbine torque determination logic block 180 illustrated in FIG. 9 is shown. In the illustrated embodiment, the turbine torque determination logic block 180 includes a function block 200 receiving as inputs the target exhaust flow rate, TEFR, the target exhaust manifold pressure, EMP, and the exhaust manifold temperature, EMT, and producing as an output a target turbine reduced flow rate, TTRFR. Illustratively, the function, F1, stored in the function block 200 produces TTRFR in accordance with the equation $TTRFR=TEFR*SQRT(EMT)/EMP$. The turbine torque determination logic block 180 further includes another function block 202 receiving as inputs the target exhaust manifold temperature, EMT, and the target turbocharger speed, TTS, and produces as an output a target turbine reduced speed, TTRS. Illustratively, the function, F2, stored in the function block 202 produces TTRS in accordance with the equation $TTRS=TTS/SQRT(EMT)$. Alternatively, this disclosure contemplates other embodiments in which F1 and/or F2 includes more, fewer and/or different input parameters.

The target turbine reduced speed, TTRS, is provided as an input to another functional block 204 that illustratively has stored therein N conventional turbine reduced flow maps corresponding to the specific configuration of the turbocharger 18. Generally, each of the turbine reduced flow maps is designed to map, for a different rack position, TTRS to turbine reduce flow rate values, TRF, at a plurality of different turbine pressure ratios (TPRS). The functional block 204 is illustratively operable to process TTRS using the N turbine reduced flow maps to generate for each rack position a number of pairs of turbine reduced flow and turbine pressure ratio values.

Figure 11:
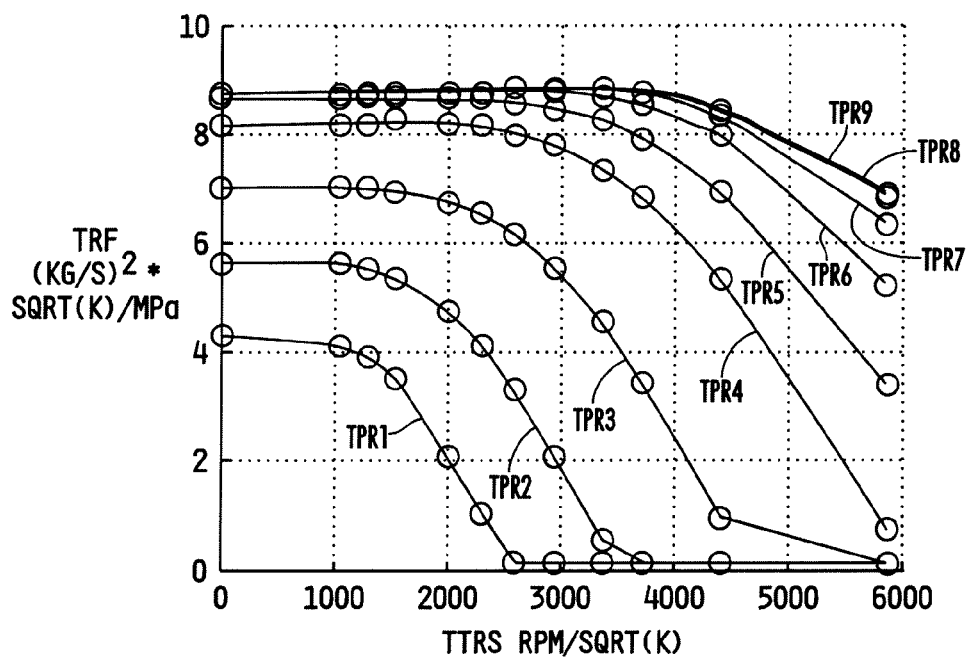
FIG. 11 is a plot of one illustrative example of one of the turbine reduced flow maps illustrated in FIG. 10.

Referring now to FIG. 11, an example of one such turbine reduced flow map is shown for one example rack position of the variable geometry turbine 24. In the illustrated embodiment, the turbine reduced flow map maps target turbine reduced speed values, TTRS, to turbine reduced flow values, TRF, at a plurality of different turbine pressure ratios, where the contours TPR1-TPR represent lines of different, constant turbine pressure ratios. With the turbine reduced flow map, any one value of TTRS thus produces a number, M, of different turbine reduced flow, TRF, and turbine pressure ratio, TPR, pairs $(TRF, TPR)_1, \ldots, (TRF, TPR)_M$, where M may be any positive integer.

Referring again to FIG. 10, the target turbine reduced flow rate, TTRFR, produced by the functional block 200 and the number of pairs of turbine reduced flow and turbine pressure ratio values, $(TRF, TPR)_{1-M}$, produced by the functional block 204 are provided as inputs to another functional block 206. The functional block 206 illustratively processes a function of at least two of the $(TRF, TPR)_{1-M}$ pair values and the TTRFR value to produce a number, N, of turbine pressure ratios; one for each of the N different rack positions. In one embodiment, for example, for each different rack position two of the $(TRF, TPR)_{1-M}$ pair values are selected with one pair having a TFR value that is less than TTRFR and the other pair having a TFR value that is greater than TTFR, and a conventional interpolation technique is used to determine a TPR value that corresponds to TCR for that rack position. In embodiments in which the function of the two $(TRF, TPR)_{1-M}$ pair values is linear, or can be acceptably approximated by a linear function, a conventional linear interpolation technique may be used to determine the N TPR values. Alternatively, in embodiments in which the function of the two $(TRF, TPR)_{1-M}$ pair values is non-linear, a conventional non-linear interpolation technique may be used to determine the N TPR values. Alternatively still, the functional block 206 may be configured to process the number of $(TRF, TPR)_{1-M}$ pair values to generate a continuous or piece-wise continuous profile of TPR values as a function of TRF, and such a profile can be processed as described above with respect to the functional block 152 to determine a TPR for each of the N different rack positions.

The target turbine reduced speed, TTRS, produced by the functional block 202 is also provided as an input to another functional block 208 that illustratively has stored therein a number, N, of conventional turbine efficiency maps corresponding to the specific configuration of the turbocharger 18. Generally, each of the N turbine efficiency maps is designed to map, for each of the N different turbine rack positions, values of TTRS to turbine efficiency (percentage) values at a plurality of different turbine pressure ratio values. The functional block 208 is illustratively operable to process TTRS using the N different turbine efficiency maps to generate for each of the N different rack positions a number of pairs of turbine efficiency and turbine pressure ratio values.

Figure 12:
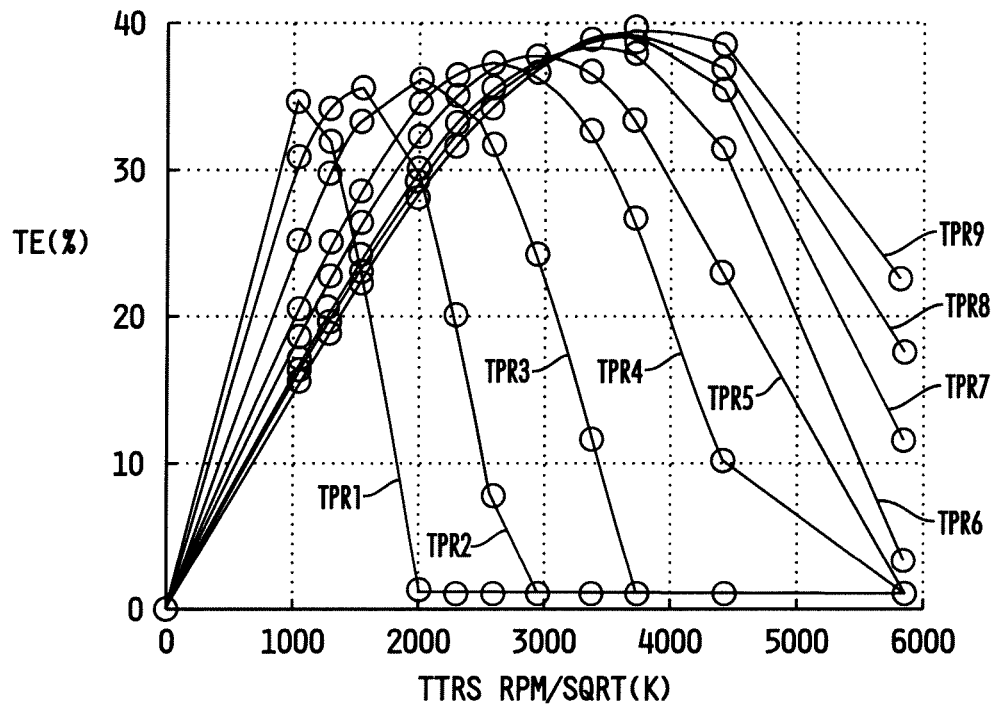
FIG. 12 is a plot of one illustrative example of one of the turbine efficiency maps illustrated in FIG. 10.

Referring now to FIG. 12, an example of one such turbine efficiency map is shown for one example rack position of the variable geometry turbine 24. In the illustrated embodiment, the turbine efficiency map maps target turbine reduced speed values, TTRS, to turbine efficiency values, TE, at a plurality of different turbine pressure ratios, where the contours TPR1-TPR9 represent lines of different, constant turbine pressure ratios. With the N turbine efficiency maps, any one value of TTRS thus produces a number, K, of different turbine efficiency, TE, and turbine pressure ratio, TPR, pairs $(TE, TPR)_1, \ldots, (TE, TPR)_K$, for each of the N different rack positions where K may be any positive integer.

Referring again to FIG. 10, the N turbine pressure ratio value, TPR, produced by the functional block 206 and the number of pairs of turbine efficiency and turbine pressure ratio values, $(TE, TPR)_{1-K}$, produced by the functional block 208 for each of the N different rack positions are provided as inputs to another functional block 210. Similarly to the functional block 204, the functional block 210 processes a function of at least two of the $(TE, TPR)_{1-K}$ pair values and the TPR value for each of the N different rack positions to produce an available turbine torque estimate, ATT, for each of the N different turbine rack positions. In one embodiment, for example, for each rack position two of the $(TE, TPR)_{1-K}$ pair values are selected with one pair having a TPR value that is less than the corresponding TPR value produced by the logic block 206 and the other pair having a TPR value that is greater than the TPR value produced by the logic block 206, and a conventional interpolation technique is used to determine a corresponding ATT value. In embodiments in which the function of the two $(TE, TPR)_{1-K}$ pair values is linear, or can be acceptably approximated by a linear function, a conventional linear interpolation technique may be used to determine the ATT values. Alternatively, in embodiments in which the function of the two $(TE, TPR)_{1-K}$ pair values is non-linear, a conventional non-linear interpolation technique may be used to determine the ATT values. Alternatively still, the functional block 210 may be configured to process the number of $(TE, TPR)_{1-K}$ pair values to generate a continuous or piece-wise continuous profile of available turbine torque values as a function of turbine efficiencies, and such a profile can be processed as described above with respect to the functional block 152 to determine ATT values for each of the N different turbine rack positions.

Referring again to FIG. 9, the turbine model 136 further includes a functional block 182 receiving the target turbocharger speed, TTS, as an input and producing as an output an inertia torque value, IT. Illustratively, IT corresponds to torque associated with the inertia of the rotating turbocharger shaft 30 and electric motor 34, and F1 illustratively determines IT as a function of TTS. In one illustrative embodiment, for example, F1 computes IT in accordance with the equation IT=I dTTS/dt, where I is the inertia associated with the rotation of the turbocharger shaft 30 and with the electric motor. Illustratively, I is a constant determined in a conventional manner as a function of the dimensions and structure of the shaft 30 and motor 34.

Figure 13:
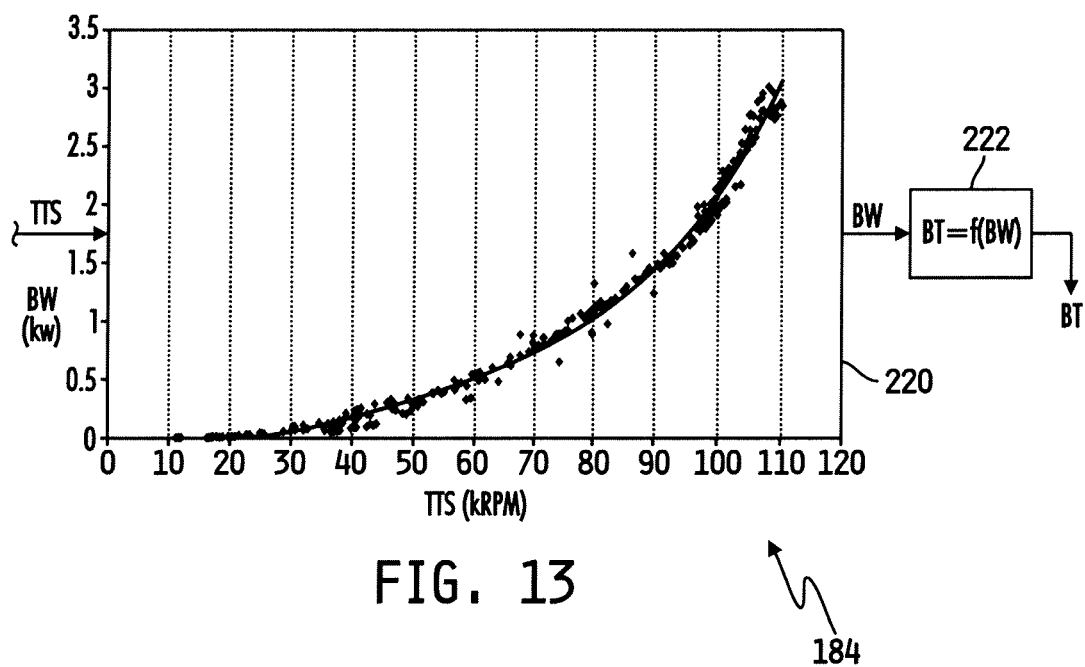
FIG. 13 is a block diagram of one illustrative embodiment and example of the function block F2 illustrated in FIG. 9.

The turbine model 136 further includes another functional block 184 receiving the target turbocharger speed, TTS, as an input and producing as an output a bearing torque value, BT. Illustratively, BT corresponds to a friction torque associated with at least one bearing of the bearing housing 70 of the turbocharger 18, and F2 illustratively determines BT as a function of TTS. Referring to FIG. 13, one illustrative embodiment of the functional block 184 is shown. In the illustrated embodiment, the functional block 184 includes turbocharger bearing work map 220 that maps the target turbine speed, TTS, to a bearing work value, BW. The bearing work value, BW, corresponding to the target turbine speed, TTS, is provided as an input to another functional block 220 that computes the bearing torque value, BT, as a function of the bearing work value, BW, provided by the map 220. In one illustrative embodiment, the functional relationship between BT and BW is given by the relationship $BT = a + b*BW + c*BW^2 - d*BW^3$, where a, b, c and d are calibratible constants. It will be understood, however, that this disclosure contemplates other relationships defining BT as a function of BW and/or that define BT as a function of TTS.

The torque values IT and BT are provided, along with the target compressor torque, TCT, to separate additive inputs of an addition block 186 such that the output of the addition block represents a total target torque, TTT=TCT+IT+BT, which is required to drive the compressor with the target compressor torque. The total target torque, TTT, is provided as one input to a VGT rack position and electric motor enable logic block 188 and the N available turbine torque values, $ATT_N$, are provided to another input of the block 188. As will be described in greater detail hereinafter with respect to FIG. 14, the logic block 188 is generally operable to select, if possible, a turbine rack position that has sufficient available torque to satisfy TTT. In such cases, the logic block 188 is operable to control $VGT_T$ to select that turbine rack position and the electric motor enable signal is not produced such that the electric motor 34 in such cases is not activated. However, in cases where the value of TTT is too large to be satisfied by the available turbine torque at any rack position, the logic block 188 is operable to control $VGT_T$ to select an appropriate turbine rack position such that ATT at that rack position is less than TTT, and to activate the electric motor enable signal, EB, such that the deficiency in the torque ATT to meet TTT is supplemented with the motor torque, MT, produced by the electric motor 34 such that together the available torque, ATT, produced by the turbine 24 and the motor torque, MT, produced by the electric motor 34 satisfy the total target torque, TTT.

Figure 14:
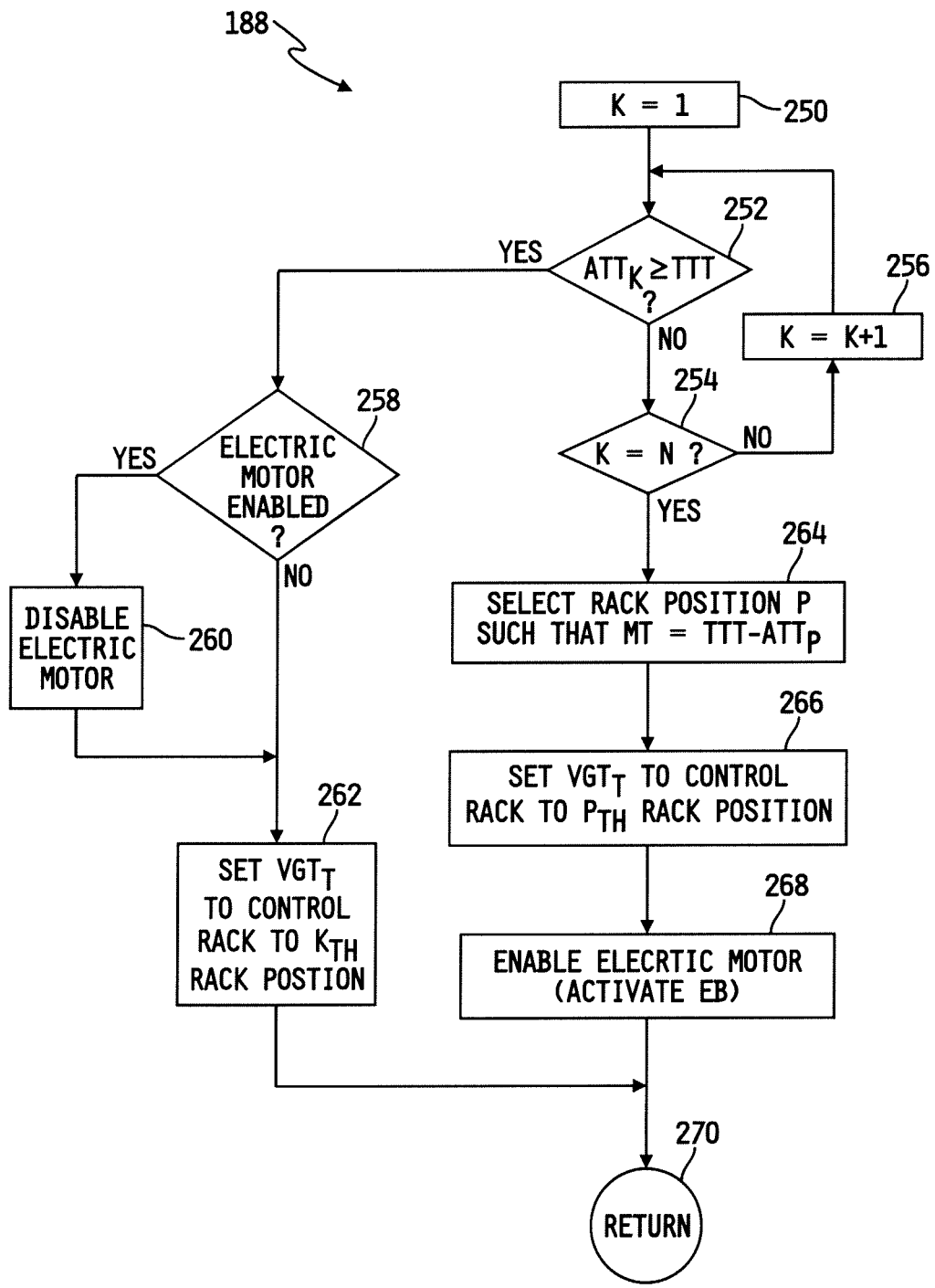
FIG. 14 is a flowchart illustrating one illustrative embodiment of a process for executing the VGT rack position and electric motor enable logic illustrated in FIG. 9.

Referring now to FIG. 14, a flowchart is shown illustrating one illustrative embodiment of the VGT rack position and electric motor enable logic 188 of FIG. 9. The process of the flowchart is illustratively stored in the memory 52 of the control circuit 50, as is the control structures and functions illustrated and described with respect to FIGS. 2-13, in the form of instructions that are executable by the control circuit 50 to carry out the illustrated process. The logic process 188 begins at step 250 where a counter value, K, is set to one. Thereafter at step 252, the control circuit 50 is operable to compare the available turbine torque at the Kth rack position, $ATT_K$, with the total target torque, TTT. If $ATT_K$ is less than TTT at step 252, the process advances to step 254 where the control circuit 50 determines whether K=N, thereby indicating that the available turbine torque values for all N turbine rack positions have been processed.

If K is not equal to N at step 254, the process advances to step 256 where the value of K is incremented by 1 and the process then loops back to step 252. If the control circuit 50 determines at step 252 that the available turbine torque, ATT, at a Kth rack position, K being some integer value between 1 and N, is greater than or equal to TTT, the process advances to step 258 where the control circuit 50 determine whether the electric motor 34 is currently enabled and therefore operational. If so, the process advances to step 260 where the control circuit 50 disables operation of the electric motor 34, e.g., by deactivating the electric motor enable signal, EB. From step 260 and from the YES branch of step 258, the process advances to step 262 where the control circuit 50 controls the target VGT control signal, $VGT_T$, to control the rack position of the turbine 24 to the Kth rack position to thereby set the target turbine torque to $ATT_K$.

If at step 254, the control circuit 50 determines that the available turbine torque values for each of the N turbine rack positions has been processed, and that the available turbine torque, ATT, is less than TTT for all such rack positions, the process advances to step 264 where the control circuit 50 selects a turbine rack position, P, such that the motor torque, MT, i.e., the torque produced by the electric motor 34 at the current target turbine speed, is equal to the difference between TTT and the available turbine torque at the Pth turbine rack position, i.e., $MT=TTT-ATT_P$. Thereafter at step 266, the control circuit 50 controls the target VGT control signal, $VGT_T$, to control the rack position of the turbine 24 to the Pth rack position to thereby set the target turbine torque to $ATT_P$. Thereafter at step 268, the control circuit 50 enables operation of the electric motor 34 by activating the electric motor enable signal, EB, so that the electric motor produces torque in the amount of the motor torque, MT. From steps 262 and 268, the process advances to step 270 where the process 188 is returned to its calling routing. Alternatively, the process may loop back to step 250 after completion of steps 262 or step 268.

Figure 15:
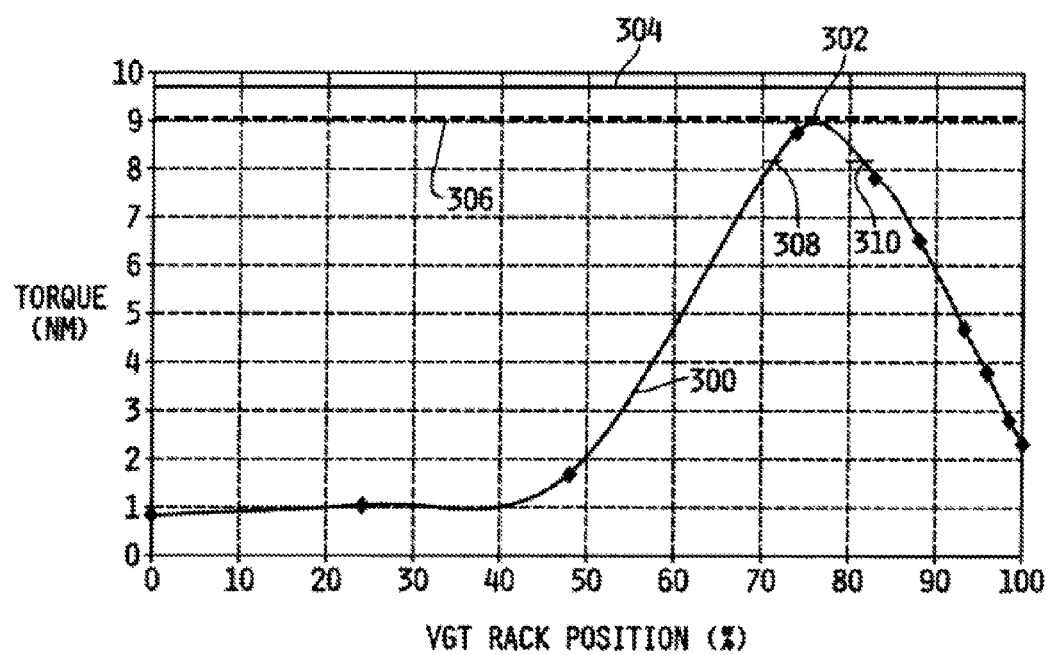
FIG. 15 is a plot of torque vs. VGT rack position illustrating operation of the process illustrated in FIG. 14 under conditions in which the total target torque cannot be met by the turbine torque alone in any VGT rack position.

Referring now to FIG. 15, a plot of turbine torque 300 vs. VGT rack position is shown for one example engine/air handling system configuration to illustrate a condition in which the available turbine torque, ATT, in all rack positions is less than the total target torque, TTT. In FIG. 15, the total target torque, TTT, is represented by the solid line 304, and the peak turbine torque 302, e.g., at 75% turbine rack position, is less than TTT. The peak torque 302 represents the turbine rack position that generates the maximum boost pressure or charge flow through the engine 12. According to steps 264 and 266 of the process illustrated in FIG. 14, a turbine rack position, P, under such conditions should be selected to produce available turbine torque in the amount of $ATT_P=TTT-MT$. In FIG. 15, the dashed line 306 represents $ATT_P$ such that the torque difference between the lines 304 and 306 represents the motor torque, MT, produced by the electric motor 34. It can be seen in FIG. 15 that under such conditions two turbine rack position solutions 308 and 310 are possible. The solution 308 is referred to as an "over-opened" VGT solution, and the solution 310 is referred to as an "over-closed" VGT solution. While either solution produces the same result in terms of torque requirements, the over-opened solution 308 is illustratively desirable for BSFC (brake specific fuel consumption) or fuel optimization because this rack position will generate lower exhaust manifold pressures, whereas the over-closed solution 310 is illustratively desirable for high EGR demands because this rack position will generate higher exhaust manifold pressures.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An air handling system for an internal combustion engine, comprising:
   a turbocharger having a variable geometry turbine fluidly coupled to an exhaust manifold of the engine and a compressor fluidly coupled to an intake manifold of the engine, the variable geometry turbine rotatably connected to the compressor via a rotatable shaft such that the variable geometry turbine rotatably drives the compressor via the rotatable shaft in response to exhaust gas passing through the variable geometry turbine,
   an electric motor coupled to the rotatable shaft of the turbocharger, and a control circuit having executable instructions stored in a non-transitory memory to:
      determine a total target torque required to drive the compressor to achieve target compressor operating parameters;
      determine a peak available turbine torque being supplied by a variable geometry turbine rack position in response to target exhaust gas conditions;
      generate a supplemental torque via activating the electric motor on the rotatable shaft of the turbocharger if the total target torque is greater than the peak available turbine torque, wherein the supplemental torque being generated by the electric motor in combining with the peak available turbine torque is to achieve the total target torque; and
      adjusting at least one of an exhaust gas flow and an exhaust gas recirculation flow via changing the variable geometry turbine rack position.

2. The system of claim 1 wherein the executable instructions stored in the non-transitory memory further include instructions that are executable by the control circuit to control the variable geometry turbine to a geometry in which the turbine produces torque in an amount of a difference between the total target torque and the supplemental torque when the electric motor is enabled to supply the supplemental torque.

3. The system of claim 2 wherein the executable instructions stored in the non-transitory memory further include instructions that are executable by the control circuit to control the variable geometry turbine to an over-opened geometry to produce the torque in the amount of the difference between the total target torque and the supplemental torque when it is desirable to optimize at least one of brake specific fuel consumption or fuel economy.

4. The system of claim 2 wherein the air handling system further includes an exhaust gas recirculation (EGR) fluid passageway fluidly coupled between the exhaust manifold and the intake manifold, and
   wherein the executable instructions stored in the non-transitory memory further include instructions that are executable by the control circuit to control the variable geometry turbine to an over-closed geometry to produce the torque in the amount of the difference between the total target torque and the supplemental torque when it is desirable to maximize exhaust gas flow through the EGR fluid passageway.

5. The system of claim 1 wherein the executable instructions stored in the non-transitory memory further include instructions that are executable by the control circuit to disable the electric motor such that the electric motor does not supply the supplemental torque to the rotatable shaft if the peak available turbine torque is greater than or equal to the total target torque.

6. The system of claim 1 wherein the executable instructions stored in the non-transitory memory further include instructions that are executable by the control circuit to determine the total target torque required to drive the compressor to achieve target compressor operating parameters by determining a target compressor torque corresponding to a target torque required to drive the compressor alone to achieve the target compressor operating conditions, determining an inertia torque as a function of a target rotational speed of the rotatable shaft, the inertia torque corresponding to torque associated with rotation of the rotatable shaft and of the electric motor, determining a bearing housing torque as a function of the target rotational speed of the rotatable shaft, the bearing housing torque corresponding to a friction torque associated with at least one bearing of a bearing housing of the turbocharger, and determining the target torque as a sum of the target compressor torque, the inertia torque and the bearing housing torque.

7. The system of claim 6 wherein the executable instructions stored in the non-transitory memory further include instructions that are executable by the control circuit to determine the target rotational speed of the rotatatable shaft based on the target compressor operating parameters.

8. The system of claim 6 wherein the executable instructions stored in the non-transitory memory further include instructions that are executable by the control circuit to determine the target compressor torque as a function of a target compressor outlet pressure and a target compressor flow rate.

9. The system of claim 1 wherein the executable instructions stored in the non-transitory memory further include instructions that are executable by the control circuit to determine the target exhaust gas conditions based on target charge parameters and target engine fueling parameters.

10. The system of claim 9 wherein the air handling system further includes an exhaust gas recirculation (EGR) fluid passageway fluidly coupled between the exhaust manifold and the intake manifold, and
wherein the executable instructions stored in the non-transitory memory further include instructions that are executable by the control circuit to determine the target exhaust gas conditions based on a target EGR flow rate.

11. A method of controlling an air handling system, carried out by a control circuit, for an internal combustion engine including a turbocharger having a variable geometry turbine fluidly coupled to an exhaust manifold of the engine and a compressor fluidly coupled to an intake manifold of the engine, and an electric motor coupled to a rotatable shaft of the turbocharger connected between the compressor and the variable geometry turbine, the method comprising:
determining a total target torque required to drive the compressor to achieve target compressor operating parameters;
determining a peak available turbine torque being supplied by a variable geometry turbine rack position in response to a target exhaust gas conditions;
generating a supplemental torque via activating an electric motor on the rotatable shaft of the turbocharger if the total target torque is greater than the peak available turbine torque, wherein the supplemental torque being generated by the electric motor in combining with the peak available turbine torque is to achieve the total target torque; and
adjusting at least one of an exhaust gas flow and an exhaust gas recirculation flow via changing the variable geometry turbine rack position.

12. The method of claim 11 further comprising controlling the variable geometry turbine to a geometry in which the turbine produces torque in an amount of a difference between the total target torque and the supplemental torque when the electric motor is enabled to supply the supplemental torque.

13. The method of claim 12 further comprising controlling the variable geometry turbine to an over-opened geometry to produce the torque in the amount of the difference between the total target torque and the supplemental torque when it is desirable to optimize at least one of brake specific fuel consumption or fuel economy.

14. The method of claim 12 wherein the air handling system further includes an exhaust gas recirculation (EGR) fluid passageway fluidly coupled between the exhaust manifold and the intake manifold, and
wherein the method further comprises controlling the variable geometry turbine to an over-closed geometry to produce the torque in the amount of the difference between the total target torque and the supplemental torque when it is desirable to maximize exhaust gas flow through the EGR fluid passageway.

15. The method of claim 11 further comprising disabling the electric motor such that the electric motor does not supply the supplemental torque to the rotatable shaft if the peak available turbine torque is greater than or equal to the target torque.

16. The method of claim 11 wherein determining the total target torque required to drive the compressor to achieve target compressor operating parameters comprises:
determining a target compressor torque corresponding to a target torque required to drive the compressor alone to achieve the target compressor operating conditions,
determining an inertia torque as a function of a target rotational speed of the rotatable shaft, the inertia torque corresponding to torque associated with rotation of the rotatable shaft and of the electric motor,
determining a bearing housing torque as a function of the target rotational speed of the rotatable shaft, the bearing housing torque corresponding to a friction torque associated with at least one bearing of a bearing housing of the turbocharger, and
computing the total target torque as a sum of the target compressor torque, the inertia torque and the bearing housing torque.

17. The method of claim 16 further comprising determining the target rotational speed of the rotatatable based on the target compressor operating parameters.

18. The method of claim 16 further comprising determining the target compressor torque as a function of a target compressor outlet pressure and a target compressor flow rate.

19. The method of claim 11 further comprising determining the target exhaust gas conditions based on target charge parameters and target engine fueling parameters.

20. The method of claim 19 wherein the air handling system further includes an exhaust gas recirculation (EGR) fluid passageway fluidly coupled between the exhaust manifold and the intake manifold, and wherein the method further comprises determining the target exhaust gas conditions based on a target EGR flow rate.

* * * * *